US010596624B2

(12) United States Patent
Sayama et al.

(10) Patent No.: US 10,596,624 B2
(45) Date of Patent: Mar. 24, 2020

(54) CAST-IRON CYLINDRICAL MEMBER AND COMPOSITE STRUCTURE

(71) Applicants: TPR CO., LTD., Tokyo (JP); TPR INDUSTRY CO., LTD., Sagae-shi, Yamagata (JP)

(72) Inventors: Akira Sayama, Sagae (JP); Koichi Hatakeyama, Sagae (JP); Akira Sato, Sagae (JP); Kazuki Seino, Sagae (JP); Katsuya Okuda, Sagae (JP); Tomoki Takiguchi, Sagae (JP)

(73) Assignees: TPR CO., LTD., Tokyo (JP); TPR INDUSTRY CO., LTD., Sagae-shi, Yamagata (JP)

( * ) Notice: Subject to any disclaimer, the term of this patent is extended or adjusted under 35 U.S.C. 154(b) by 13 days.

(21) Appl. No.: 16/090,123

(22) PCT Filed: Nov. 17, 2017

(86) PCT No.: PCT/JP2017/041498
§ 371 (c)(1),
(2) Date: Sep. 28, 2018

(87) PCT Pub. No.: WO2019/097678
PCT Pub. Date: May 23, 2019

(65) Prior Publication Data
US 2019/0358701 A1 Nov. 28, 2019

(51) Int. Cl.
*B22D 19/08* (2006.01)
*F02F 1/00* (2006.01)
(Continued)

(52) U.S. Cl.
CPC ......... *B22D 19/0009* (2013.01); *B22D 19/08* (2013.01); *F02F 1/004* (2013.01);
(Continued)

(58) Field of Classification Search
CPC ..... B22D 19/0009; B22D 19/08; F02F 1/004; F02F 2200/06; F16J 10/04
See application file for complete search history.

(56) References Cited

U.S. PATENT DOCUMENTS

| 7,882,818 B2 | 2/2011 | Takami et al. |
| 2005/0161187 A1 | 7/2005 | Kodama et al. |

(Continued)

FOREIGN PATENT DOCUMENTS

| CN | 2900814 Y | 5/2007 |
| CN | 105626294 A | 6/2016 |

(Continued)

OTHER PUBLICATIONS

Search Report for European Patent Application No. 17894667.9, dated Mar. 14, 2019.
(Continued)

*Primary Examiner* — Jacob M Amick
(74) *Attorney, Agent, or Firm* — Merchant & Gould P.C.

(57) ABSTRACT

Provided is a cast-iron cylindrical member having projections (P) formed integrally with a casted surface (an outer peripheral surface), and a composite structure including the cast-iron cylindrical member and an outer periphery-side member. The cast-iron cylindrical member satisfies:

(A) 0.50 mm>a height (H) of the projections (P)≥0.20 mm;
(B) 180≥a total number (N) of the projections (P) per $cm^2$ of the outer peripheral surface≥61;
(C) the projections (P) include a projection (Pn) having a constricted shape;
(D) a ratio (NP) of the projections (Pn) to the projections (P)≥50%;
(E) a bonding strength index (S) expressed by: $S = H^2 \times N \times NP$ is equal to or larger than 310; and
(F1) a bonding strength F(Al) obtained when the outer peripheral surface of the cast-iron cylindrical member is cast-in inserted with an aluminum alloy exceeds a boundary bonding strength (Fb) expressed by: $Fb = 1.325 \times H^2 \times N - 0.75$.

18 Claims, 20 Drawing Sheets

(51) Int. Cl.
    *B22D 19/00*     (2006.01)
    *F16D 65/10*     (2006.01)
    *F16J 10/04*     (2006.01)

(52) U.S. Cl.
    CPC .......... *F02F 2200/06* (2013.01); *F16D 65/10* (2013.01); *F16J 10/04* (2013.01)

(56) References Cited

U.S. PATENT DOCUMENTS

| | | |
|---|---|---|
| 2007/0240652 A1 | 10/2007 | Michioka et al. |
| 2009/0272261 A1 | 11/2009 | Sato et al. |
| 2015/0122118 A1* | 5/2015 | He .......................... C23C 4/04 92/171.1 |

FOREIGN PATENT DOCUMENTS

| | | |
|---|---|---|
| EP | 1711291 A1 | 10/2006 |
| JP | 2003-326346 A | 11/2003 |
| JP | 2003-326353 A | 11/2003 |
| JP | 2005-194983 A | 7/2005 |
| JP | 2009-264347 A | 11/2009 |
| JP | 3180621 U | 12/2012 |

OTHER PUBLICATIONS

Office Action for Chinese Patent Application No. 201780016982.5, dated Apr. 16, 2019.
International Search Report and Written Opinion for PCT/JP2017/041498, dated Jan. 23, 2018.

* cited by examiner

CAST-IRON CYLINDRICAL MEMBER AND COMPOSITE STRUCTURE

This application is a National Stage of International Patent Application No. PCT/JP2017/041498, filed Nov. 17, 2017, which application is incorporated herein by reference. To the extent appropriate, a claim of priority is made to the above disclosed application.

TECHNICAL FIELD

The present invention relates to a cast-iron cylindrical member and a composite structure.

BACKGROUND ART

A cast-iron cylindrical member is used for a cylinder liner for an internal combustion engine, a brake drum for an internal expanding drum brake, a bearing member, a supporting member, or the like. The cast-iron cylindrical member described above has an outer peripheral surface that is cast-in inserted with, for example, a metal material so that the cast-iron cylindrical member and a member (outer periphery-side member) provided on the outer peripheral surface side of the cast-iron cylindrical member are integrated. Therefore, for the purpose of improvement of bonding strength between the cast-iron cylindrical member and the outer periphery-side member and the like, a cast-iron cylindrical member having a plurality of projections formed on an outer peripheral surface thereof has been proposed (Patent Literature 1 to Patent Literature 3, and the like).

Shapes of the projections formed on the outer peripheral surface of the cast-iron cylindrical member and the like are varied. For example, a height of projections formed on an outer peripheral surface of a cast-in cylinder liner disclosed in Patent Literature 1 ranges from 0.5 mm to 1.0 mm. A height of projections formed on a cast-in member made of cast iron disclosed in Patent Literature 2 is set within a range of from 0.5 mm to 1.2 mm for use for cylinder liners.

Further, in Patent Literature 3, there is disclosed a cast-iron cylindrical member having an average value of the height of projections, which ranges from 0.25 mm to 0.85 mm, and the number of projections, which ranges from 55/cm$^2$ to 152/cm$^2$, as a test example. The technology described in Patent Literature 3 has an object to provide a cast-in structure having high thermal conductivity and high bonding strength, which can be reduced in thickness.

CITATION LIST

Patent Literature

[PTL 1] JP 4429025 B2
[PTL 2] JP 4210468 B2
[PTL 3] JP 2009-264347 A

SUMMARY OF INVENTION

Technical Problem

On the other hand, in addition to excellent bonding strength to the outer periphery-side member, the cast-iron cylindrical member is sometimes required to further reduce a total thickness T of the cast-iron cylindrical member in accordance with a purpose of use of the cast-iron cylindrical member. Meanwhile, the total thickness T is a sum of a projection height Tp and a thickness Tb of a main body portion of the cylindrical member except for the projections. Therefore, in order to reduce the total thickness T, any one or both of the projection height Tp and the thickness Tb of the main body portion of the cylindrical member is/are required to be reduced. However, the reduction in thickness Tb of the main body of the cylindrical member leads to a reduction in strength of the cast-iron cylindrical member, and therefore is not practical in some cases.

In view of the facts described above, it is considered that the technologies described in Patent Literature 1 and Patent Literature 2 in which the height of the projections is at least 0.5 mm are basically inappropriate. On the other hand, it is considered that the technology described in Patent Literature 3 in which the height of the projections can be set smaller than 0.5 mm is appropriate as compared to the technologies described in Patent Literature 1 and Patent Literature 2. However, as a result of examination conducted on the technology described in Patent Literature 3 by the inventors of the present invention, it has been proved that it is difficult to further reduce the total thickness T of the cast-iron cylindrical member while ensuring predetermined bonding strength in a region in which the height of the projections is smaller than 0.5 mm.

The present invention has been made in view of the circumstances described above, and has an object to provide a cast-iron cylindrical member and a composite structure capable of ensuring sufficient bonding strength and adhesion with an outer periphery-side member even when a projection height is further reduced.

Solution to Problem

The above-mentioned object can be achieved by the following embodiments of the present invention. In the first cast-iron cylindrical member according to one embodiment of the present invention, there is provided a cast-iron cylindrical member having an outer peripheral surface, the outer peripheral surface of the cast-iron cylindrical member being made up of a casted surface and having a plurality of projections (P) formed integrally with the casted surface, wherein: (A) the plurality of projections (P) have a height equal to or larger than 0.20 mm and smaller than 0.50 mm; (B) a total number of the plurality of projections (P) per cm$^2$ of the outer peripheral surface is equal to or larger than 61 and equal to or smaller than 180; (C) the plurality of projections (P) include a projection (Pn) having a constricted shape; (D) a ratio of a number of the projections (Pn) having the constricted shape to a number of the plurality of projections (P) present on the outer peripheral surface is equal to or larger than 50%; (E) a value S expressed by:

$$S = H^2 \times N \times NP \qquad \text{Expression (1)}$$

is equal to or larger than 310; and (F1) a bonding strength F (Al) obtained when the outer peripheral surface of the cast-iron cylindrical member is cast-in inserted with an aluminum alloy exceeds a value Fb expressed by:

$$Fb = 1.325 \times H^2 \times N - 0.75, \qquad \text{Expression (2)}$$

in Expression (1) and Expression (2), S is a bonding strength index, H is the height (mm) of the plurality of projections (P), N is a total number (number/cm$^2$) of the plurality of projections (P) per cm$^2$ of the outer peripheral surface, NP is a ratio (%) of the number of projections (Pn) having the constricted shape to the number of the plurality of projections (P) present on the outer peripheral surface, and Fb is a boundary bonding strength (MPa).

In the second cast-iron cylindrical member according to one embodiment of the present invention, there is provided a cast-iron cylindrical member having an outer peripheral surface, the outer peripheral surface of the cast-iron cylindrical member being made up of a casted surface and having a plurality of projections (P) formed integrally with the casted surface, wherein: (A) the plurality of projections (P) have a height equal to or larger than 0.20 mm and smaller than 0.50 mm; (B) a total number of the plurality of projections (P) per $cm^2$ of the outer peripheral surface is equal to or larger than 61 and equal to or smaller than 180; (C) the plurality of projections (P) include a projection (Pn) having a constricted shape; (D) a ratio of a number of the projections (Pn) having the constricted shape to a number of the plurality of projections (P) present on the outer peripheral surface is equal to or larger than 50%; (E) a value S expressed by:

$$S=H^2 \times N \times NP \qquad \text{Expression (1)}$$

is equal to or larger than 310; and (F2) a ratio of the number of projections (Pn) having the constricted shape, each having 0.65 or smaller as a ratio of a height of a position of a most constricted portion to a height of the projection (Pn) having the constricted shape, to the number of projections (Pn) having the constricted shape present on the outer peripheral surface is equal to or larger than 40%, in Expression (1), S is a bonding strength index, H is the height (mm) of the plurality of projections (P), N is a total number (number/$cm^2$) of the plurality of projections (P) per $cm^2$ of the outer peripheral surface, NP is a ratio (%) of the number of projections (Pn) having the constricted shape to the number of the plurality of projections (P) present on the outer peripheral surface.

In the first and second cast-iron cylindrical members according to one embodiment of the present invention, it is preferred that the conditions (A) to (E), (F1), and (F2) be satisfied.

In the first and second cast-iron cylindrical members according to another embodiment of the present invention, it is preferred that, when an area ratio of a region surrounded by a contour line at a measurement height of 0.15 mm on a contour map is S1, the area ratio S1 falls within a range of from 15% to 50%, the contour map being obtained by measuring 1 $cm^2$ of the outer peripheral surface by radiation of a laser beam onto the outer peripheral surface by using a non-contact three-dimensional laser measuring apparatus.

In the first and second cast-iron cylindrical members according to another embodiment of the present invention, it is preferred that the bonding strength index S be equal to or larger than 500.

In the first and second cast-iron cylindrical members according to another embodiment of the present invention, it is preferred that at least part of the outer peripheral surface of the cast-iron cylindrical member be covered with another member so that the cast-iron cylindrical member and the another member are integrated with each other.

In the first and second cast-iron cylindrical members according to another embodiment of the present invention, it is preferred that the cast-iron cylindrical member be a cylinder liner for an internal combustion engine in which a piston and a piston ring slide on an inner peripheral surface of the cast-iron cylindrical member in a reciprocating manner.

In the first and second cast-iron cylindrical members according to another embodiment of the present invention, it is preferred that the cast-iron cylindrical member be a brake drum for an internal expanding drum brake in which brake shoes slide on an inner peripheral surface of the cast-iron cylindrical member.

In the first composite structure according to one embodiment of the present invention, there is included: a cast-iron cylindrical member having an outer peripheral surface, the outer peripheral surface of the cast-iron cylindrical member being made up of a casted surface and having a plurality of projections (P) formed integrally with the casted surface, the cast-iron cylindrical member satisfying: (A) the plurality of projections (P) have a height equal to or larger than 0.20 mm and smaller than 0.50 mm; (B) a total number of the plurality of projections (P) per $cm^2$ of the outer peripheral surface is equal to or larger than 61 and equal to or smaller than 180; (C) the plurality of projections (P) include a projection (Pn) having a constricted shape; (D) a ratio of a number of the projections (Pn) having the constricted shape to a number of the plurality of projections (P) present on the outer peripheral surface is equal to or larger than 50%; (E) a value S expressed by:

$$S=H^2 \times N \times NP \qquad \text{Expression (1)}$$

is equal to or larger than 310; and (F1) a bonding strength F (Al) obtained when the outer peripheral surface of the cast-iron cylindrical member is cast-in inserted with an aluminum alloy exceeds a value Fb expressed by:

$$Fb=1.325 \times H^2 \times N - 0.75, \qquad \text{Expression (2)}$$

in Expression (1) and Expression (2), S is a bonding strength index, H is the height (mm) of the plurality of projections (P), N is a total number (number/$cm^2$) of the plurality of projections (P) per $cm^2$ of the outer peripheral surface, NP is a ratio (%) of the number of projections (Pn) having the constricted shape to the number of the plurality of projections (P) present on the outer peripheral surface, and Fb is a boundary bonding strength (MPa); and an outer periphery-side member, which covers at least a part of the outer peripheral surface of the cast-iron cylindrical member, wherein the cast-iron cylindrical member and the outer periphery-side member are integrated with each other.

In the second composite structure according to one embodiment of the present invention, there is included: a cast-iron cylindrical member having an outer peripheral surface, the outer peripheral surface of the cast-iron cylindrical member being made up of a casted surface and having a plurality of projections (P) formed integrally with the casted surface, the cast-iron cylindrical member satisfying: (A) the plurality of projections (P) have a height equal to or larger than 0.20 mm and smaller than 0.50 mm; (B) a total number of the plurality of projections (P) per $cm^2$ of the outer peripheral surface is equal to or larger than 61 and equal to or smaller than 180; (C) the plurality of projections (P) include a projection (Pn) having a constricted shape; (D) a ratio of a number of the projections (Pn) having the constricted shape to a number of the plurality of projections (P) present on the outer peripheral surface is equal to or larger than 50%; (E) a value S expressed by:

$$S=H^2 \times N \times NP \qquad \text{Expression (1)}$$

is equal to or larger than 310; and (F2) a ratio of the number of projections (Pn) having the constricted shape, each having 0.65 or smaller as a ratio of a height of a position of a most constricted portion to a height of the projection (Pn) having the constricted shape, to the number of projections (Pn) having the constricted shape present on the outer peripheral surface is equal to or larger than 40%, in Expression (1), S is a bonding strength index, H is the height (mm) of the plurality of projections (P), N is a total number (number/$cm^2$) of the plurality of projections (P) per $cm^2$ of the outer peripheral surface, NP is a ratio (%) of the number of projections (Pn) having the constricted shape to the number of the plurality of projections (P) present on the outer peripheral surface; and an outer periphery-side member, which covers at least a part of the outer peripheral surface of the cast-iron cylindrical member, wherein the cast-iron cylindrical member and the outer periphery-side member are integrated with each other.

In the first and second composite structures according to one embodiment of the present invention, it is preferred that the conditions (A) to (E), (F1), and (F2) be satisfied.

In the first and second composite structures according to another embodiment of the present invention, it is preferred that: the outer periphery-side member includes a metal outer periphery-side member; and at least a part of the outer peripheral surface of the cast-iron cylindrical member is cast-in inserted with the metal outer periphery-side member.

Advantageous Effects of Invention

According to the present invention, it is possible to provide the cast-iron cylindrical member and composite structure capable of ensuring sufficient bonding strength and adhesion with the outer periphery-side member even when the projection height is further reduced.

BRIEF DESCRIPTION OF DRAWINGS

FIG. 4 are photographs each for showing an example of the projection having the constricted shape, in which

FIG. 5 are schematic views for illustrating an example of an internal combustion engine including the cast-iron cylindrical members (cylinder liners) according to this embodiment, in which

FIG. 8 are schematic views for illustrating Step C illustrated in FIG. 7, in which

FIG. 11 are schematic views for illustrating a method of measuring a constriction ratio by using a microscope, in which

FIG. 15 are schematic views for illustrating a double-type cylinder manufactured for measurement of an air gap ratio and a test piece obtained from the double-type cylinder, in which

DESCRIPTION OF EMBODIMENTS

Figure 1:
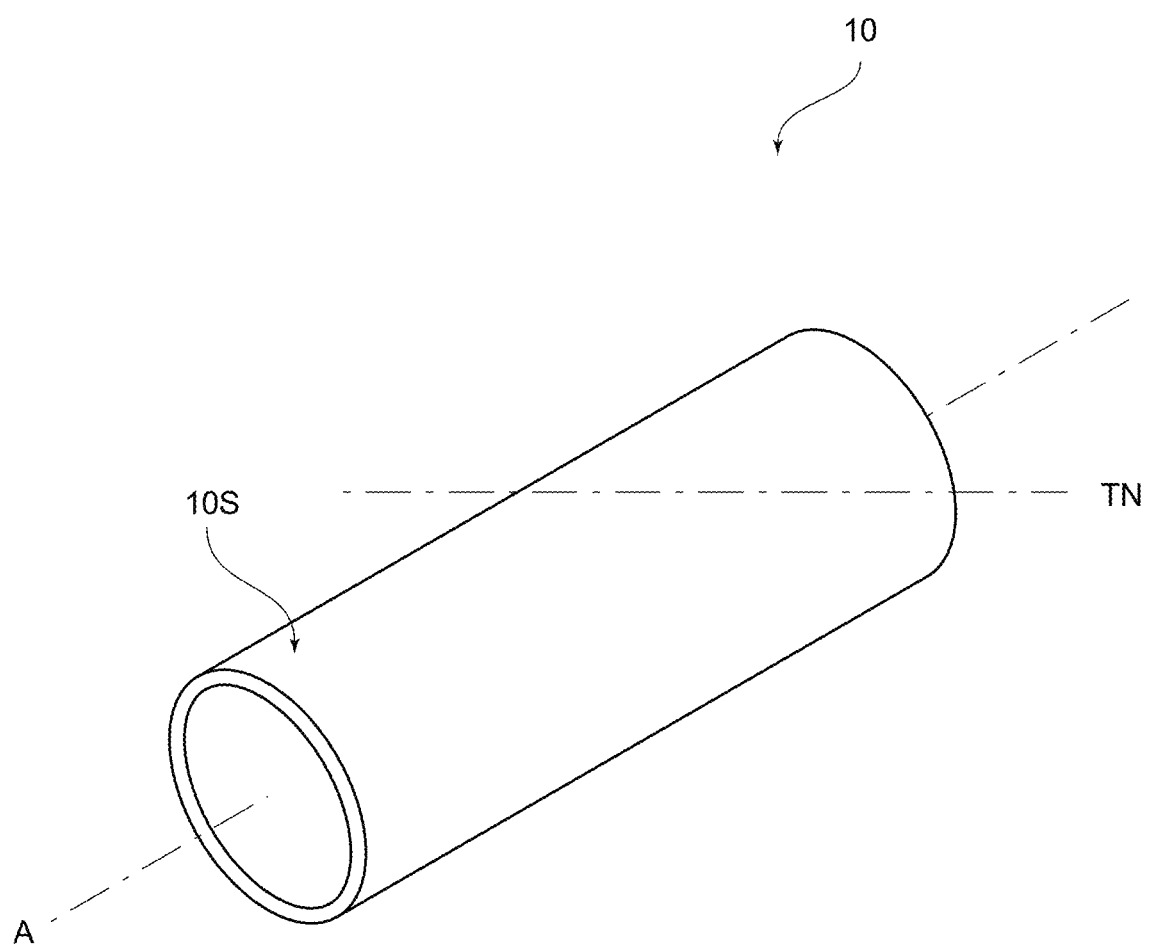
FIG. 1 is an external perspective view for illustrating an example of a cast-iron cylindrical member according to an embodiment of the present invention.

A first cast-iron cylindrical member according to an embodiment of the present invention has an outer peripheral surface, the outer peripheral surface of the cylindrical member being made up of a casted surface and having a plurality of projections P formed integrally with the casted surface. The cast-iron cylindrical member has the following features (A) to (F1).

(A) The plurality of projections P have a height equal to or larger than 0.20 mm and smaller than 0.50 mm.

(B) A total number of the plurality of projections P per $cm^2$ of the outer peripheral surface is equal to or larger than 61 and equal to or smaller than 180.

(C) The plurality of projections P include a projection Pn having a constricted shape.

(D) A ratio of a number of the projections Pn having the constricted shape to a number of the plurality of projections P present on the outer peripheral surface is equal to or larger than 50%.

(E) A value S expressed by Expression (1) is equal to or larger than 310.

(F1) A bonding strength F (Al) obtained when the outer peripheral surface of the cylindrical member is cast-in inserted with an aluminum alloy exceeds a value Fb expressed by Expression (2).

$$S = H^2 \times N \times NP \quad \text{Expression (1)}$$

$$Fb = 1.325 \times H^2 \times N - 0.75 \quad \text{Expression (2)}$$

In Expression (1) and Expression (2), S is a bonding strength index, H is the height (mm) of the plurality of projections P, N is a total number (number/cm$^2$) of the plurality of projections P per cm$^2$ of the outer peripheral surface, NP is a ratio (%) of the number of the projections Pn having the constricted shape to the number of the plurality of projections P present on the outer peripheral surface, and Fb is a boundary bonding strength (MPa).

Further, a second cast-iron cylindrical member according to the embodiment has a feature described as the following condition (F2) in place of the condition (F1) for the first cast-iron cylindrical member according to the embodiment. Otherwise, the second cast-iron cylindrical member according to the embodiment is the same as the first cast-iron cylindrical member according to the embodiment.

(F2) A ratio of the number of projections Pn having the constricted shape, each having 0.65 or smaller as a ratio of a height of a position of a most constricted portion to a height of the projections Pn having the constricted shape, to the number of projections Pn having the constricted shape present on the outer peripheral surface is equal to or larger than 40%.

In the cast-iron cylindrical member according to the embodiment, it is preferred that all the conditions (A) to (E), (F1), and (F2) be satisfied.

The height of the projections P formed on the outer peripheral surface of the cast-iron cylindrical member of this embodiment is smaller than the height of the projections formed on the outer peripheral surface of the cast-iron cylindrical member exemplified in Patent Literature 1 or Patent Literature 2. Accordingly, as compared to the cast-iron cylindrical members of Patent Literature 1 and Patent Literature 2, it is easy for the cast-iron cylindrical member of this embodiment to reduce a total thickness T of the cast-iron cylindrical member without reducing a thickness Tb of a main body portion of the cylindrical member. Further, the projections are formed on the outer peripheral surface of the cast-iron cylindrical member so as to satisfy all the conditions (A) to (E) and the condition (F1) described above or all the conditions (A) to (E) and the condition (F2) described above. Thus, bonding strength and adhesion between the cast-iron cylindrical member and an outer periphery-side member can be sufficiently ensured.

(A) Height H of Projection P

A height H of the projection is equal to or larger than 0.20 mm and smaller than 0.50 mm. Through setting of the height H of the projection P to be smaller than 0.50 mm, it becomes extremely easier to reduce the total thickness T of the cast-iron cylindrical member. In addition, the thickness Tb of the main body portion of the cast-iron cylindrical member is not required to be reduced so as to reduce the total thickness T. Thus, a reduction in strength of the cast-iron cylindrical member, which is caused by reducing the thickness Tb of the main body portion of the cast-iron cylindrical member, can be prevented. On the other hand, through setting of the height H of the projection P to be equal to or larger than 0.20 mm, it becomes easier to form the projection Pn having the constricted shape, which is effective to improve the bonding strength to the outer periphery-side member. Thus, it becomes easier to ensure sufficient bonding strength.

The height H of the projection P can be appropriately selected within a range of from 0.20 mm to smaller than 0.50 mm in accordance with a use or a purpose of use of the cast-iron cylindrical member of this embodiment. For example, when an importance is desired to be given on improvement of the bonding strength than on a further reduction in the total thickness T, it is preferred that the height H of the projection P be set to 0.25 mm or larger and smaller than 0.50 mm, more preferably, 0.30 mm or larger and smaller than 0.50 mm. When an importance is desired to be given on the further reduction in the total thickness T than on the improvement of the bonding strength, it is preferred that the height H of the projection P be equal to or larger than 0.20 mm and equal to or smaller than 0.35 mm, and more preferably, equal to or larger than 0.20 mm and equal to or smaller than 0.30 mm.

The height H of the projection P means a distance from a basal surface (outer peripheral basal surface) of the projection P formed on the outer peripheral surface of the cast-iron cylindrical member to the highest portion of a top surface of the projection P based on the outer basal surface as a reference. The outer peripheral basal surface is at the same height as a region of the outer peripheral surface, on which the projections P are not formed. The height of the projection P is determined based on a height of this surface as a reference (0 mm). A specific method of measuring the height H of the projection P is described later.

(B) Total Number N of Projections P

A total number N (density N) of the projections P per cm$^2$ of the outer peripheral surface (hereinafter sometimes abbreviated as "projection number N") is equal to or larger than 61 and equal to or smaller than 180. Through setting of the projection number N to 61 or larger, it becomes easier to ensure sufficient bonding strength. Further, through setting of the projection number N to 180 or smaller, formability of the projection Pn having the constricted shape is improved, thereby making it extremely easier to ensure sufficient bonding strength. In addition, when the cast-iron cylindrical member of this embodiment and the outer periphery-side member are integrated while the outer periphery-side member is formed through a process of applying, to an outer peripheral surface (casted surface) of the cast-iron cylindrical member, a liquid or powdered raw material for formation of the outer periphery-side member, which is used for the formation of the outer periphery-side member, a portion between the adjacent projections P can smoothly be filled with the raw material for formation of the outer periphery-side member. Thus, formation of an air gap at a bonding interface between the cast-iron cylindrical member and the outer periphery-side member after the integration is suppressed. As a result, sufficient adhesion can be ensured. The projection number N more preferably falls within a range of from 70 to 160, further preferably, within a range of from 75 to 145, particularly preferably, within a range of from 80 to 140.

As the raw material for formation of the outer periphery-side member used for the formation of the outer periphery-side member, a material that is solidified by cooling under a high-temperature state, a liquid material that is cured through a polymerization reaction, or a powered raw material that is fused, sintered, or the like by heating can be used. The liquid material includes a paste-like material. Specific examples of the liquid raw material include: (i) a molten metal in a case of casting, and (ii) in a case of resin molding, a resin material in a molten state used for injection molding and a paste-like curable composition or a liquid-like curable composition containing a polymerizable monomer as a main component used for die molding, application molding, and inkjet molding. Specific examples of the powered raw material include powders of a metal, an inorganic oxide, and a resin, and a composite material thereof.

(C) Projection Pn Having Constricted Shape

The projections P formed on the outer peripheral surface include the projection Pn having the constricted shape. The projection P and the projection Pn having the constricted shape are described below with reference to the drawings.

Figure 2:
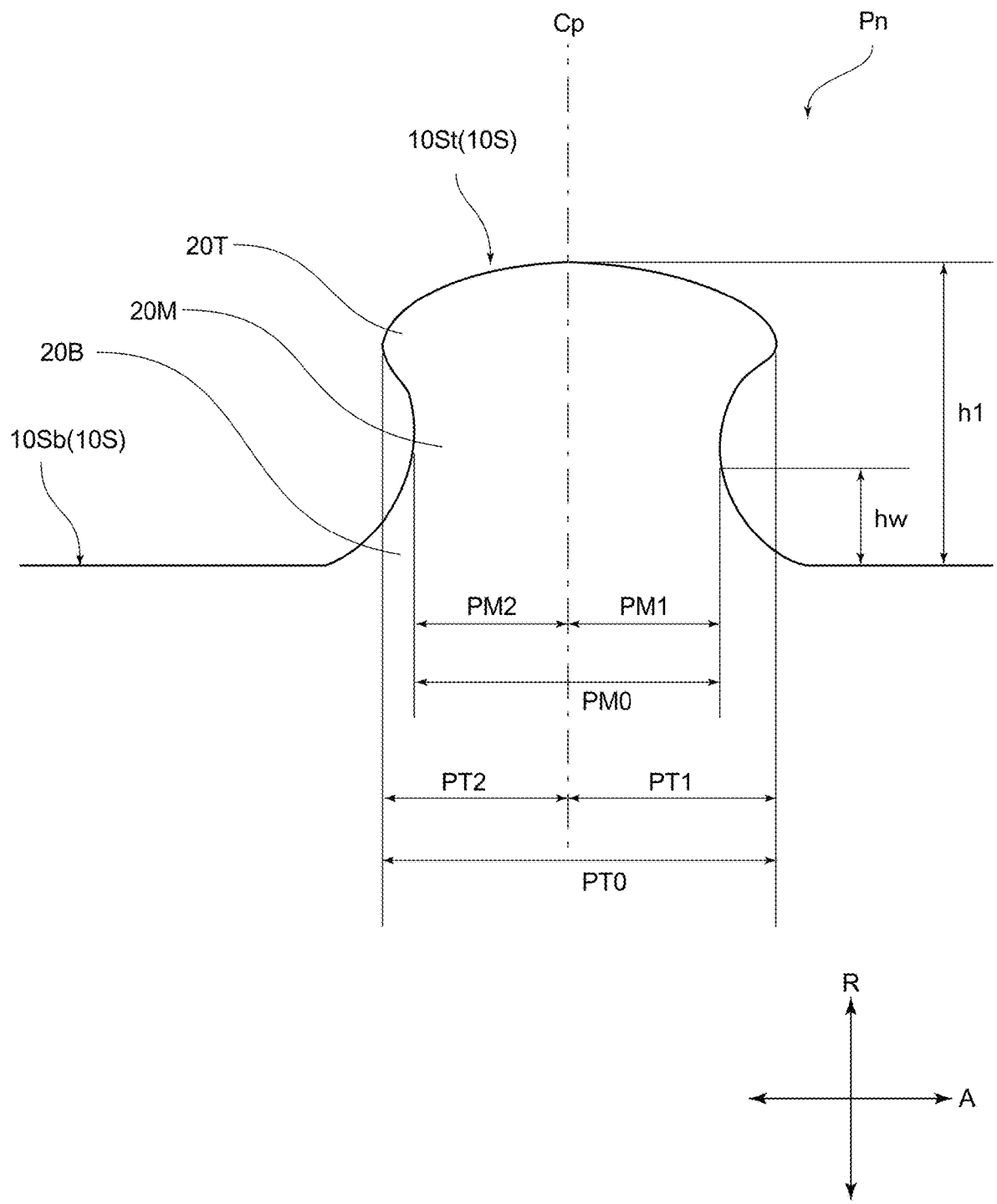
FIG. 2 is an enlarged side view for illustrating an example of a projection having a constricted shape, which is formed on an outer peripheral surface of the cast-iron cylindrical member according to this embodiment.
Figure 3:
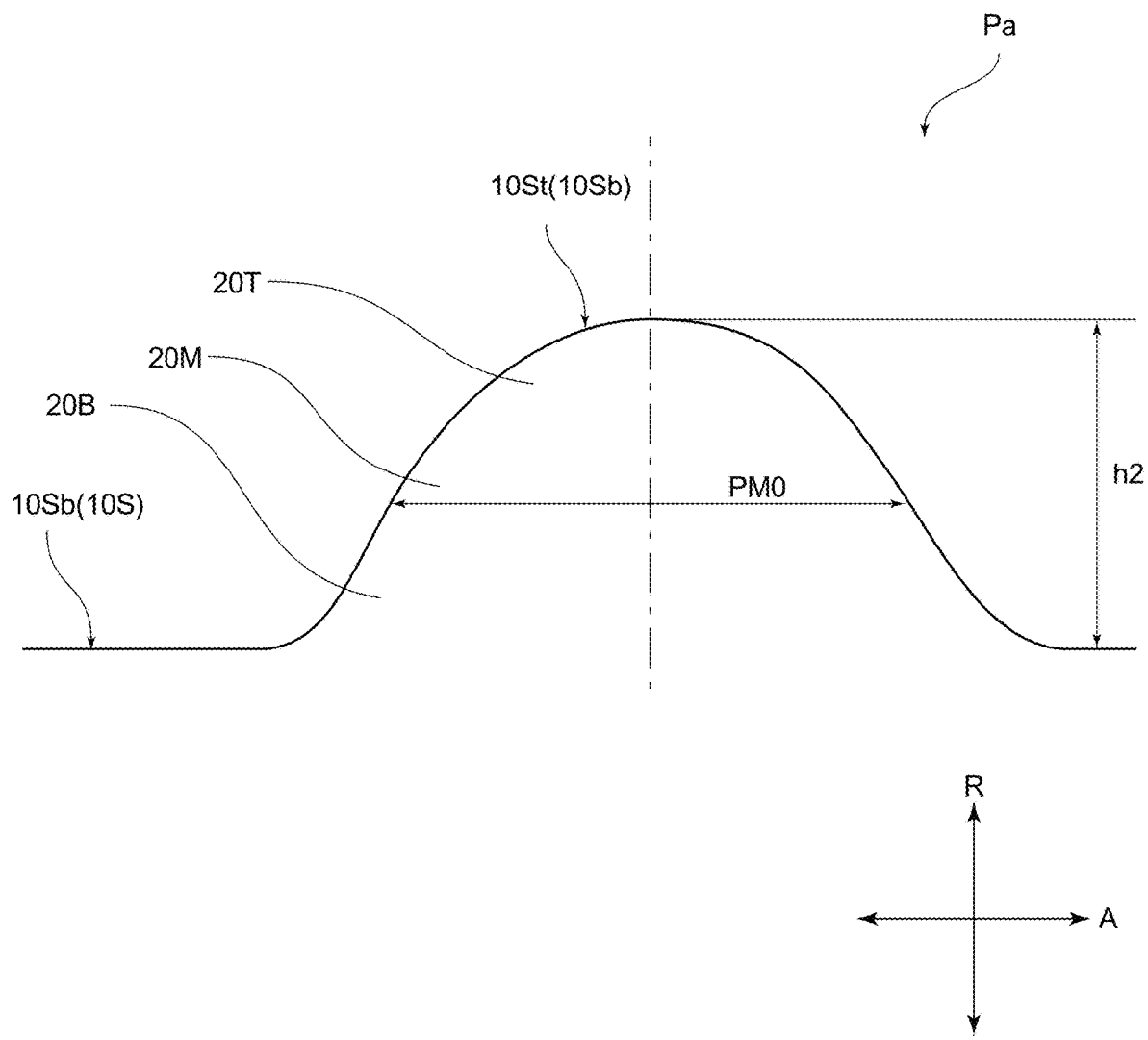
FIG. 3 is an enlarged side view for illustrating an example of the projection having another shape, which is formed on the outer peripheral surface of the cast-iron cylindrical member according to this embodiment.

FIG. 1 is an external perspective view for illustrating an example of the cast-iron cylindrical member according to this embodiment. FIG. 2 is an enlarged side view for illustrating an example of the projection having the constricted shape, which is formed on the outer peripheral surface of the cast-iron cylindrical member according to this embodiment. FIG. 3 is an enlarged side view for illustrating an example of the projection having another shape, which is formed on the outer peripheral surface of the cast-iron cylindrical member according to this embodiment. In FIG. 1 to FIG. 3, the reference symbol A denotes a center axis, or an axial direction of a cast-iron cylindrical member 10, and the reference symbol R denotes a radial direction of the cast-iron cylindrical member 10, which is orthogonal to the axial direction A. The radial direction R is also a direction parallel to a height direction of the projections P.

On an outer peripheral surface 10S made up of a casted surface of the cast-iron cylindrical member 10 of this embodiment illustrated in FIG. 1, a plurality of projections P (not shown in FIG. 1) are formed integrally with the casted surface. In FIG. 2, there is illustrated an example of a side geometry of the projection P when the outer peripheral surface 10S illustrated in FIG. 1 is observed from a tangent direction TN of the outer peripheral surface 10S.

The projection Pn having the constricted shape illustrated in FIG. 2 projects by a height h1 toward an outer periphery side in the radial direction R from a reference surface (specifically, at a height of 0 mm) being a region (outer peripheral basal surface 10Sb) of the outer peripheral surface 10S, on which the projections Pn are not formed. The projection Pn having the constricted shape has three portions, that is, (i) a basal portion 20B that is continuous from the outer peripheral basal surface 10Sb, (ii) an intermediate portion 20M continuous with the basal portion 20B, which is formed on an outer periphery side of the basal portion 20B in the radial direction R, and (iii) a top portion 20T continuous with the intermediate portion 20B, which is formed on an outer periphery side of the intermediate portion 20M in the radial direction R and has a top surface 10St, that is, part of the outer peripheral surface 10S of the projection Pn having the constricted shape. A width (length in a direction parallel to the axial direction A) of the projection Pn having the constricted shape has a minimum value at the intermediate portion 20M and has a maximum value at the top portion 20T from an inner periphery side to the outer periphery side in the radial direction R.

The projection Pn having the constricted shape more precisely means a projection that satisfies Expressions (3) to (5).

$$PT0 - PM0 > 0 \quad \text{Expression (3)}$$

$$PT1 \geq PM1 \quad \text{Expression (4)}$$

$$PT2 \geq PM2 \quad \text{Expression (5)}$$

In Expression (3) to Expression (5), PT0 is a width (maximum width) at the top portion 20T of the projection Pn having the constricted shape, and PM0 is a width (minimum width) at the intermediate portion 20M of the projection Pn having the constricted shape. In this case, a distance from the outer peripheral basal surface 10Sb (reference surface, height 0 mm) toward the outer peripheral side in the radial direction R to a position at which the minimum width PM0 is represented is referred to as a height hw at the position of the most constricted portion. Further, in a case in which a line which bisects the minimum width PM0 and is parallel to the radial direction R is a center line Cp of the projection Pn having the constricted shape, (a) when the maximum width PT0 is divided into two at the center line Cp, PT1 is a length of a width of one portion in a width direction and PT2 is a length of a width of another portion in the width direction, (b) when the minimum width PM0 is divided into two at the center line Cp, PM1 is a length of a width of one portion in the width direction and PM2 is a length of a width of another portion in the width direction. The amount of constriction (PT0−PM0) of the projection Pn having the constricted shape of the cast-iron cylindrical member 10 of this embodiment only needs to be larger than 0 mm, and generally falls within a range of from about 0.02 mm to about 0.24 mm.

Whether or not the projection P corresponds to the projection Pn having the constricted shape that satisfies Expression (3) to Expression (5) is actually determined by observation of a side surface of the projection P with a microscope from a direction away from the outer peripheral surface 10S at an angle of about 30° with respect to the tangent TN on the outer peripheral surface of the cast-iron cylindrical member 10 on a plane orthogonal to the center axis A of the cast-iron cylindrical member 10. Details of a procedure of the observation with the microscope are described later.

On the other hand, the projection P that does not satisfy at least any one of Expression (3) to Expression (5) is classified into a projection Pa having another shape. The projection Pa having the another shape typically includes a projection exemplified in FIG. 3. The projection Pa having the another shape exemplified in FIG. 3 projects by a height h2 toward the outer periphery side in the radial direction R from a reference surface (specifically, at a height of 0 mm) being a region (outer peripheral basal surface 10Sb) of the outer peripheral surface 10S, on which the projection Pa is not formed. Similarly to the projection Pn having the constricted shape illustrated in FIG. 2, the projection Pa having the another shape is composed of three portions, that is, the basal portion 20B, the intermediate portion 20M, and the top portion 20T. However, the projection Pa having the another shape differs from the projection Pn having the constricted shape in that a width of the projection Pa having the another shape only gradually decreases from the inner periphery side toward the outer periphery side in the radial direction R, and the width PM0 at the intermediate portion 20M is not the minimum width.

Figure 4A:
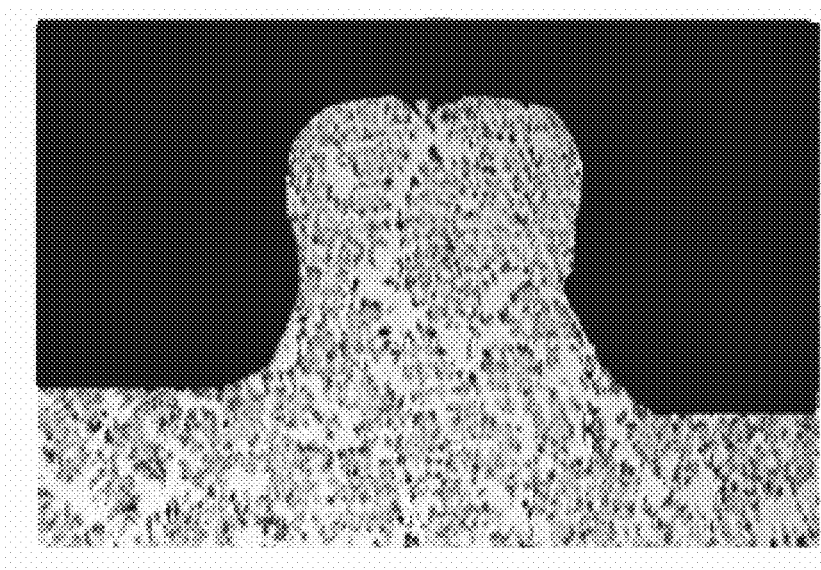
FIG. 4(A) is an example of a photograph (metallographic photograph) of a cross section of the projection having the constricted shape.
Figure 4B:
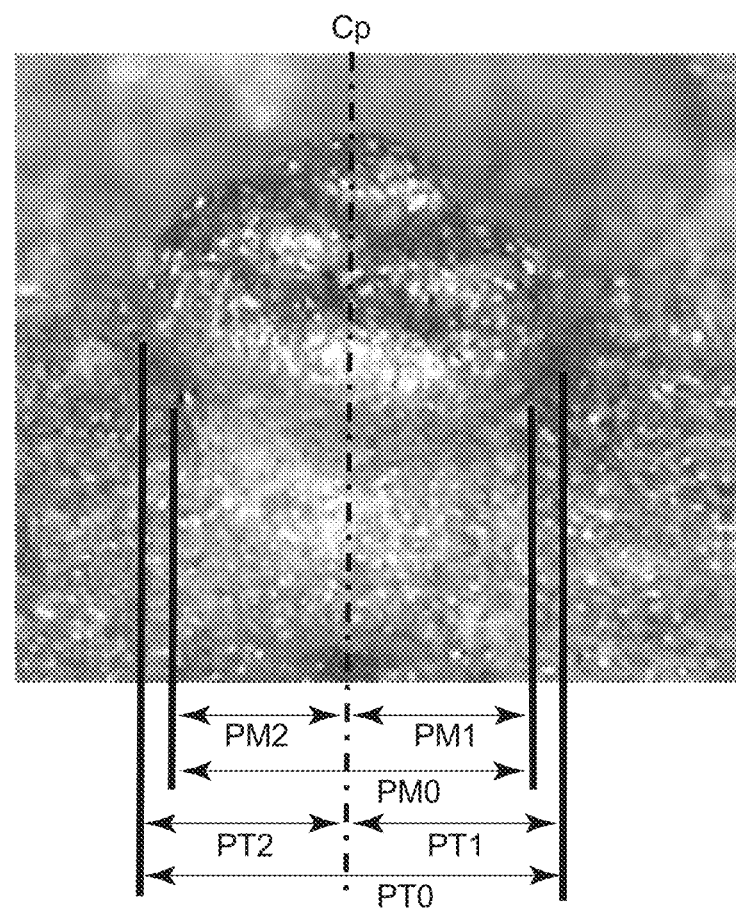
FIG. 4(B) is an example of a side photograph when a side surface of the projection having the constricted shape is observed by a microscope from a direction obliquely upward by about 30 degrees with respect to a tangent of the outer peripheral surface of the cast-iron cylindrical member.

For reference, in FIG. 4, an example of the projection Pn having the constricted shape is shown. FIG. 4(A) is an example of a photograph (metallographic photograph) of a cross section of the projection Pn having the constricted shape, and FIG. 4(B) is an example of a side photograph when a side surface of the projection Pn having the constricted shape is observed by a microscope from a direction obliquely upward by about 30 degrees with respect to the tangent TN.

(D) Ratio NP of Projections Pn Having Constricted Shape

A ratio NP of the number of the projections Pn having the constricted shape to the number of the projections P being present on the outer peripheral surface (hereinafter sometimes abbreviated as "constriction ratio NP") is equal to or larger than 50%, preferably 60% or larger, more preferably 70% or larger, further preferably 80% or larger, and particularly preferably 90% or larger. The projection Pn having the constricted shape is constricted at the intermediate portion 20M. Thus, the cast-iron cylindrical member 10 of this embodiment and the outer periphery-side member can firmly adhere to each other. Therefore, through setting of the constriction ratio NP to 50% or larger, it becomes easier to ensure sufficient bonding strength. Further, the ratio NP of the projections Pn having the constricted shape is an average value of the ratio of the projections Pn, each having an individual constricted shape. A specific method of measuring the ratio NP of the projections Pn having the constricted shape is described later.

(E) Bonding Strength Index S

A bonding strength index S expressed by Expression (1) is 310 or larger, preferably 350 or larger, and more preferably 500 or larger. Through setting of the bonding strength index S to 310 or larger, sufficient bonding strength can be ensured.

As disclosed in Patent Literature 1 and Patent Literature 2, there is known that the bonding strength between the cast-iron cylindrical member and the outer periphery-side member can be improved by forming the projections having the constricted shape on the outer peripheral surface of the cast-iron cylindrical member. In Patent Literature 1, high bonding strength is ensured by controlling the height of the projections having the constricted shape, the number of projections having the constricted shape, and an area ratio obtained by slicing the projection having the constricted shape at a predetermined height. Thus, the inventors of the present invention have attempted to improve the bonding strength by similarly controlling the individual factors including the height H of the projection P, the total number N of the projections P, and the area ratio, which are considered to affect the bonding strength. When the height H of the projection P is smaller than 0.5 mm, however, there have been found many cases where the bonding strength cannot be ensured only by controlling the above-mentioned factors.

Although a reason of occurrence of the above-mentioned cases is not clear, the inventors of the present invention suppose the reason as follows. Specifically, when the height H of the projection P is equal to or larger than 0.5 mm as disclosed in Patent Literature 1, it is extremely easy to form the projection Pn having a shape greatly constricted at the intermediate portion 20M. On the other hand, when the height H of the projection P is smaller than 0.5 mm, the formation itself of the projection Pn having the constricted shape tends to be more difficult. In addition, a degree of constriction of the projection Pn having the constricted shape is liable to be relatively small. Further, the inventors of the present invention have found that, when a large number of the projections P are observed from the tangent direction TN and the radial direction R, a profile shape of the projection P in a case in which the height H of the projection P is smaller than 0.5 mm and a profile shape of the projection P in a case in which the height H of the projection P is equal to or larger than 0.5 mm greatly differ from each other and show low similarity. From those findings, it is supposed that when the height H of the projection P is small as compared to that of the related art, kinds of factors greatly affecting the bonding strength and a degree of contribution of each of the factors to the bonding strength greatly change. Thus, as a result of trial and error, the inventors of the present invention have found the bonding strength index S expressed by Expression (1) as an index highly correlated with the bonding strength in a region in which the height H of the projection P is smaller than 0.5 mm.

(F1) Boundary Bonding Strength F

The bonding strength F (Al) obtained when the outer peripheral surface of the first cast-iron cylindrical member of this embodiment is cast-in inserted with the aluminum alloy exceeds the boundary bonding strength Fb expressed by Expression (2).

$$Fb=1.325 \times H^2 \times N - 0.75 \qquad \text{Expression (2)}$$

The bonding strength F (Al) exceeds the boundary bonding strength Fb expressed by Expression (2). Therefore, in the first cast-iron cylindrical member of this embodiment, even in a region in which the height H of the projections P is equal to or larger than 0.2 mm and smaller than 0.5 mm, the cast-iron cylindrical member and the outer periphery-side member (another member) with which the outer peripheral surface of the cast-iron cylindrical member is cast-in inserted can be more firmly bonded to each other.

As is apparent from Expression (1), the bonding strength index S which has a high correlation with the bonding strength is a parameter specified by three variables (the height H of the projections P, the total number N of projections P, and the ratio NP of the projections Pn having the constricted shape). However, it is considered that an actual bonding strength also depends on shape elements of the projections P, in particular, various shape elements of the projections Pn having the constricted shape, which have a high effect to improve the bonding strength, for example, a degree of constriction (such as a ratio of the minimum width PM0 and the maximum width PT0 or a ratio of the height h1 and the height hw of the position of the most constricted portion representing the minimum width PM0), a planar shape, presence or absence of surface roughness, and a degree of the surface roughness, and regularity and symmetry of the shape. In this regard, the bonding strength index S has a high correlation with the bonding strength. However, the bonding strength S is not a parameter perfectly corresponding to the bonding strength. Further, it is considered that, when the height H of the projections P is smaller than 0.5 mm, the shape elements of the projections P having the constricted shape relatively more affect the bonding strength as compared to the height H of the projections P.

Therefore, based on the above-mentioned knowledge, the inventors of the present invention have found that the boundary bonding strength Fb which is defined as a function of $H^2 \times N$ as expressed in Expression (2) as the parameter also in consideration of the shape of the projections P in the region in which the height H of the projections P is equal to or larger than 0.2 mm and smaller than 0.5 mm. In this case, in a linear function expressed in the right-hand side of Expression (2), an inclination a=1.325 and an intercept b=−0.75 are values of constants which comprehensively represent the shape elements of the projection P necessary for achieving a predetermined bonding strength in a case in which a value of $H^2 \times N$ is constant. Specifically, it means that, in the case in which the value of $H^2 \times N$ is constant, when the bonding strength F (Al), which is actually measured, exceeds the boundary bonding strength Fb, the shape elements of the projections P are comprehensively more suitable for the improvement of the bonding strength and, when the bonding strength F (Al) is equal to or smaller than Fb, the shape elements of the projection P are comprehensively less suitable for the improvement of the bonding strength.

Under the condition (F1), it is merely determined, for sake of convenience, whether the shape elements of the projection P are comprehensively more suitable for the improvement of the bonding strength by comparing the bonding strength F (Al) obtained when the outer peripheral surface of the first cast-iron cylindrical member of this embodiment is cast-in inserted with the aluminum alloy and the boundary bonding strength Fb expressed by Expression (2) to each other. Therefore, the first cast-iron cylindrical member of this embodiment not only may construct a composite structure with a member made of an aluminum alloy but, apparently, also may construct a composite structure with a member made of a material other than the aluminum alloy.

(F2) Ratio NP2 of the Projections Pn Having the Constricted Shape, which Satisfies: $0 < Hw/h1 \leq 0.65$ In the second cast-iron cylindrical member of this embodiment, the ratio NP2 of the number of projections Pn having the constricted shape, each having 0.65 or smaller as the ratio (hw/h1) of the height hw of the position of the most constricted portion to the height h1 of the projection Pn having the constricted shape, to the number of projections Pn having the constricted shape which are present on the outer peripheral surface, is equal to or larger than 40%. The ratio NP2 is preferably equal to or larger than 45%, and more preferably, equal to or larger than 50%. Although an upper limit of the ratio NP2 is not particularly limited, it is preferred that the upper limit thereof be closer to 100%.

The ratio (hw/h1) is the ratio of the height h1 of the projection Pn and the height hw of the position of the most constricted portion representing the minimum width PM0 of the projection Pn, as illustrated in FIG. 2. An increase in the value means that the most constricted portion is present at a higher position in the height direction of the projection Pn. Meanwhile, the inventors of the present invention observed the projections Pn having various constricted shapes with different ratios (hw/h1) for the projections P having the height H of the projections P being equal to or larger than 0.2 mm and smaller than 0.5 mm, which are smaller than related-art projections. Then, the inventors of the present invention have figured out that the amount of constriction (PT0−PM0) increases as the ratio (hw/h1) decreases, resulting in tendency of further increase in size of the top portion 20T. In this case, when the size of the top portion 20T further increases, the top portion 20T is present in a deeply biting manner into the counterpart member (outer periphery-side member) which is bonded to the cast-iron cylindrical member. Therefore, as the ratio NP2 increases, the bonding strength between the cast-iron cylindrical member and the outer periphery-side member can be increased. In particular, by setting the ratio NP2 to 40% or larger, the bonding strength can be significantly improved in the region in which the height of the projections P is equal to or larger than 0.2 mm and smaller than 0.5 mm even in comparison to the related art described in Patent Literature 3 and the like.

(G) Area Ratio S1

The cast-iron cylindrical member 10 of this embodiment only needs to satisfy at least the conditions (A) to (E) and the condition (F1) described above or the conditions (A) to (E) and the condition (F2) described above. It is further preferred that an area ratio S1 fall within a range of from 15% to 50%, more preferably within a range of from 20% to 50%. Through setting of the area ratio S1 to 15% or higher, the basal portion 20B of the projection P becomes thicker so that the projection P is unlikely to be broken. Thus, it becomes easier to ensure sufficient bonding strength. Further, through setting of the area ratio S1 to 50% or smaller, roughening of a casted surface of the basal portion 20B of the projection P and the periphery thereof can be suppressed. Therefore, when the outer peripheral surface 10S is covered with the raw material for formation of the outer periphery-side member such as the molten metal to be used for the formation of the outer periphery-side member, the formation of the air gap between the outer periphery-side member and the cast-iron cylindrical member 10 can be suppressed to make it easier to ensure sufficient adhesion.

The area ratio S1 means an area ratio of a region surrounded by a contour line at a measurement height of 0.15 mm in a measurement area (area of 1 $cm^2$), which includes a region surrounded by the contour line and a boundary forming an outer periphery of the measurement area, on a contour map obtained by measuring 1 $cm^2$ of the outer peripheral surface 10S by radiation of a laser beam onto the outer peripheral surface 10S of the cast-iron cylindrical member 10 by using a non-contact three-dimensional laser measuring apparatus.

<Composite Structure and Outer Periphery-Side Member>

Although the use of the cast-iron cylindrical member 10 of this embodiment is not particularly limited, it is generally particularly preferred that the cast-iron cylindrical member 10 and the outer periphery-side member be used under an integrated state by covering at least part of the outer peripheral surface 10S with the outer periphery-side member (another member). In this case, a composite structure including the cast-iron cylindrical member 10 of this embodiment and the outer periphery-side member which covers at least a part of the outer peripheral surface 10S of the cast-iron cylindrical member 10 of this embodiment, in which the cast-iron cylindrical member 10 and the outer periphery-side member are integrated with each other, can be obtained. It is preferred that the composite structure be a cast-in structure in which the outer periphery-side member is a metal outer periphery-side member made of an aluminum alloy, a magnesium alloy, an iron alloy, or the like and at least a part of the outer peripheral surface of the cast-iron cylindrical member is cast-in inserted with the metal outer periphery-side member. Before or after the integration of the cast-iron cylindrical member 10 and the outer periphery-side member, processing such as cutting may be performed on an inner peripheral surface of the cast-iron cylindrical member 10.

Here, the term "the cast-iron cylindrical member 10 and the outer periphery-side member under the integrated state" means a state in which the cast-iron cylindrical member 10 and the outer periphery-side member are bonded by applying the liquid or powered raw material for formation of the outer periphery-side member so that the raw material covers the outer peripheral surface 10S, and then performing cooling and solidifying or polymerizing and curing in a case of the liquid raw material and fusing or sintering through heating in a case of the powdered raw material, to thereby form the outer periphery-side member. In the above-mentioned process, the liquid raw material or the powdered raw material is filled between the plurality of projections P at adjacent positions on the outer peripheral surface 10S, and the constricted portion of the projection Pn having the constricted shape is also filled with the liquid raw material or the powdered raw material. Therefore, the projections P, in particular, the projection Pn having the constricted shape, can firmly engage with the outer periphery-side member. As a result, high bonding strength can be obtained.

Although the material for forming the outer periphery-side member is suitably selected in accordance with the use of the cast-iron cylindrical member 10, it is generally preferred that a different kind of material from the material of the cast-iron cylindrical member 10 be used. However, the same kind of material as the material of the cast-iron cylindrical member 10 can also be used as the material of the outer periphery-side member as needed.

<Cylinder Liner and Brake Drum>

Although the use of the cast-iron cylindrical member 10 of this embodiment is not particularly limited, it is particularly preferred that the cast-iron cylindrical member 10 be used as, for example, a cylinder liner or a brake drum.

Figure 5B:
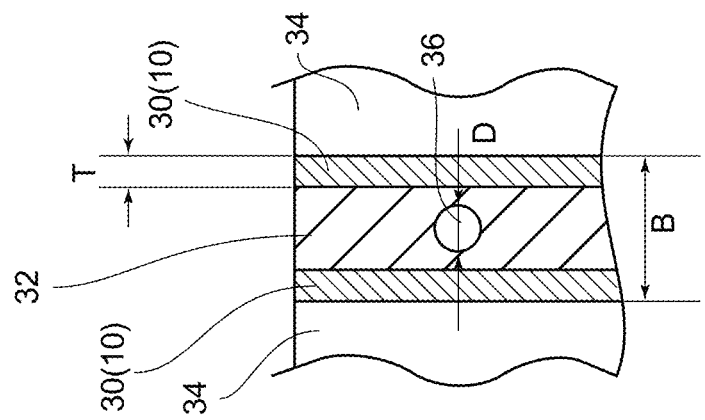
FIG. 5(A) is a perspective view of the internal combustion engine and FIG. 5(B) is a sectional view for illustrating an example of a sectional structure taken along the line IIB-IIB of FIG. 5(A).
Figure 5A:
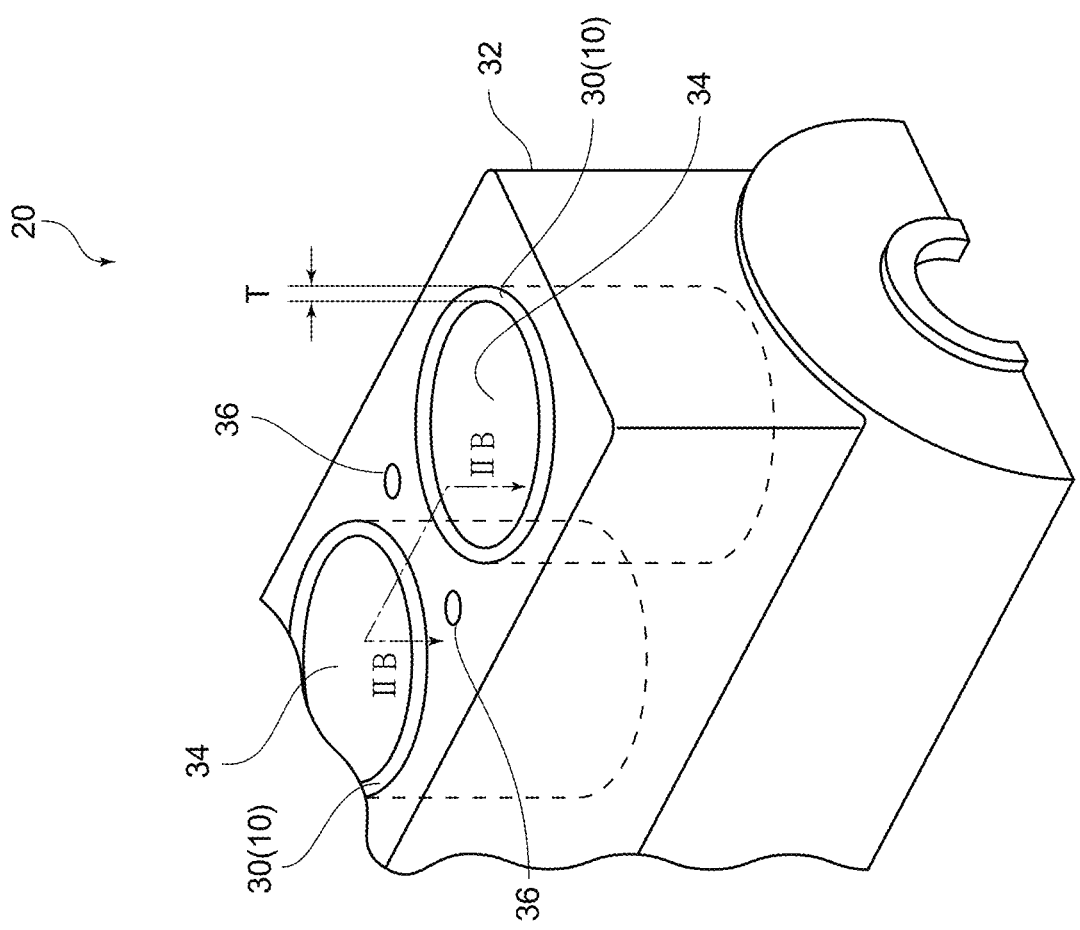

FIG. 5 are schematic views for illustrating an example of an internal combustion engine including the cast-iron cylindrical members (cylinder liners) according to this embodiment. An internal combustion engine 20 illustrated in FIG. 5 has a structure in which a plurality of cylinder liners 30 and a cylinder block 32 (outer periphery-side member) that casts the plurality of cylinder liners 30 therein are integrated with each other. Further, in the internal combustion engine 20 illustrated in FIG. 5, a cooling fluid passage 36 is provided between two adjacent cylinder bores 34. Precisely, the cooling fluid passage 36 is provided between the outer peripheral surfaces 10S of the two adjacent cylinder liners 30. In FIG. 5, illustration of members other than the cylinder liners 30 and the cylinder block 32, and the projections P formed on the outer peripheral surfaces 10S is omitted. Further, a thickness T of the cylinder liners 30 illustrated in FIG. 5 means a total thickness including the height of the projections P. As the cylinder liner 30, a member in a state in which the inner peripheral surface (casted surface) of the cast-iron cylindrical member 10 of this embodiment is processed immediately after the casting is used.

As a material for forming the cylinder block 32, for example, an aluminum alloy material can be used in view of weight reduction and cost. As the aluminum alloy, for example, "JIS ADC10 (related US standard ASTM A380.0)" or "JIS ADC12 (related US standard ASTM A383.0) is used.

Meanwhile, the internal combustion engine 20 has a problem in a cooling method for reducing a temperature of an inner wall surface of each of the cylinder bores 34, which is increased by engine combustion. Therefore, through increase in passage diameter (outer diameter D) of the cooling fluid passage 36 provided between the two adjacent cylinder bores 34, cooling efficiency for the cylinder bores 34 can be increased. For example, when a thickness B between the cylinder bores 34 is 8 mm, the outer diameter D of the cooling fluid passage 36 is 3 mm, and the thickness T of the cylinder liners 30 is 2.5 mm, a thickness between each of the cylinder liners 30 and the cooling fluid passage 36 is 0 mm. Therefore, a cooling fluid such as water flowing through the cooling fluid passage 36 is leaked into a combustion chamber or a crank case through the outer peripheral surfaces of the cylinder liners 30. Due to the leakage, there is a fear of occurrence of engine functional disorder.

When, for example, the related-art cylinder liner disclosed in Patent Literature 1 or the like, which has the projections P that have the height H of the projection P equal to or larger than 0.5 mm and are formed on the outer peripheral surface 10S, is used as the cylinder liner 30, a thickness of a main body portion of the cylinder liner 30 except for the projections P, of the thickness T of the cylinder liner 30, is required to be reduced or the thickness B between the cylinder bores 34 is required to be further increased so as to set the thickness between each of the cylinder liners 30 and the cooling fluid passage 36 to a value exceeding 0 mm. When the thickness of the main body portion of each of the cylinder liners 30 except for the projections P is further reduced, however, the strength of the cylinder liners 30 is lowered. As a result, the cylinder bores 34 are liable to be deformed. On the other hand, when the thickness B between the cylinder bores 34 is further increased, reduction in cooling performance of the internal combustion engine 20 is brought about.

In contrast to this, when the cast-iron cylindrical member 10 of this embodiment, which has the projections P that have the height H of the projection P smaller than 0.50 mm and are formed on the outer peripheral surface 10S, is used, the thickness between each of the cylinder liners 30 and the cooling fluid passage 36 can be set to a value larger than 0 mm without further increasing the thickness B between the cylinder bores 34 or reducing the thickness of the main body portion of each of the cylinder liners 30. Further, when the thickness B between the cylinder bores 34 is further increased, the outer diameter D of the cooling fluid passage 36 can be further increased.

For example, when the height H of the projection P is changed from 0.75 mm to 0.35 mm while the thickness of the main body portion of the cylinder liner 30 except for the height portion of the projection P is kept constant, the thickness T of the cylinder liner 30 can be reduced by 0.40 mm. Therefore, in designing the sectional structure of a portion between the cylinder bores 34, a margin of 0.80 mm can be obtained. Thus, with the use of the margin, the cooling performance for the internal combustion engine 20 can be improved by reducing the thickness of the portion (cylinder block 32) between the cylinder bores 34 except for the cylinder liners 30 or increasing the outer diameter D of the cooling fluid passage 36 while the strength of the cylinder liners 30 is maintained.

Further, when the bonding strength between the cylinder liners 30 and the cylinder block 32 is insufficient, the cylinder bores 34 are liable to be deformed. As a result, an increase in friction between a piston or a piston ring and the cylinder liner 30 is brought about. Further, when the adhesion at the bonding interface between each of the cylinder liners 30 and the cylinder block 32 is insufficient, high heat generated by the engine combustion is difficult to transfer from the cylinder liner 30 side to the cylinder block side 32. As a result, the cooling performance for the internal combustion engine 20 is liable to be degraded. When the cast-iron cylindrical member 10 of this embodiment is used as the cylinder liner 30, however, excellent bonding strength and adhesion between the cylinder liner 30 and the cylinder block 32 is obtained. Thus, it is easy to greatly suppress the above-mentioned problems. Further, in the case of the cast-iron cylinder member 10 of this embodiment, the height H of the projections P is small and the projection number N is large. Thus, there is provided an advantage in uniformity of heat radiation from the outer peripheral surface 10S.

Figure 6:
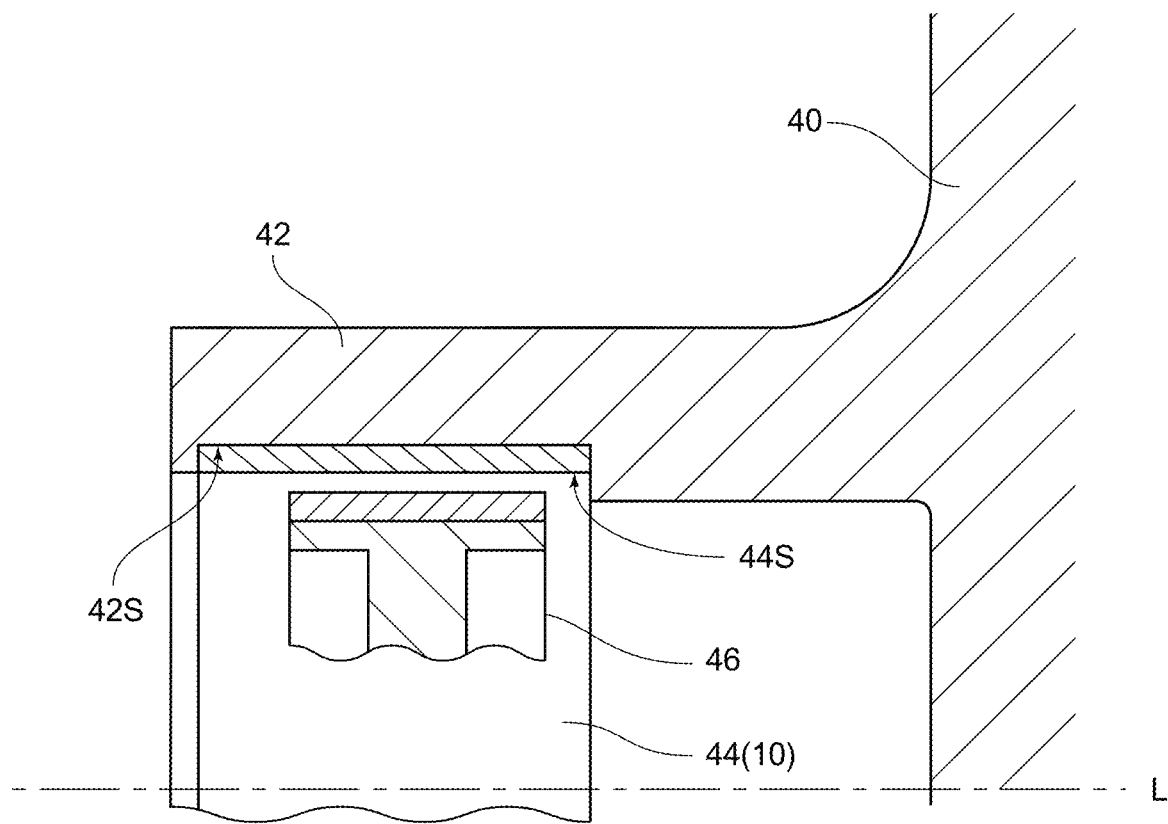
FIG. 6 is a schematic sectional view for illustrating an example of an internal expanding drum brake including the cast-iron cylindrical member (brake drum) according to this embodiment.

Further, the cast-iron cylindrical member 10 of this embodiment is suitably used as a brake drum of an internal expanding drum brake having an inner peripheral surface sliding on brake shoes. FIG. 6 is a schematic sectional view for illustrating an example of the internal expanding drum brake including the cast-iron cylindrical member (brake drum) of this embodiment. FIG. 6 is a sectional view obtained when a wheel is cut along a plane containing a rotation axis of the wheel. In FIG. 6, illustration of the projections P is omitted. As exemplified in FIG. 6, a brake drum 44, that is, the cast-iron cylindrical member 10 of this embodiment is mounted through cast-in insert on an inner peripheral surface 42S of a drum portion 42 (outer periphery-side member) having an approximately cylindrical shape. The drum portion 42 makes up part of a wheel 40 having a centerline La as a rotation axis. Brake shoes 46 are arranged on a side closer to the inner peripheral surface 44S of the brake drum 44. At the time of braking, the brake shoes 46 come into contact with the inner peripheral surface 44S of the brake drum 44 to slide thereon. As the drum portion 42, an aluminum alloy, a magnesium alloy, or the like can be used in view of weight reduction and strength.

In the internal expanding drum brake, when the bonding strength between the brake drum 44 and the drum portion 42 is insufficient, a relative displacement occurs between the two. As a result, the drum portion 42 is liable to be deformed. In addition, when the adhesion between the brake drum 44 and the drum portion 42 is insufficient, conductivity for radiating frictional heat generated by the friction between the inner peripheral surface 44S of the brake drum 44 and the brake shoes 46 during the braking toward the drum portion 42 side is lowered. As a result, permanent deformation of the drum portion 42 is liable to be brought about. When the cast-iron cylindrical member 10 of this embodiment is used as the brake drum 44, however, excellent bonding strength and adhesion between the brake drum 44 and the drum portion 42 are obtained. Thus, it is easy to greatly suppress the above-mentioned problems. Further, in the case of the cast-iron cylindrical member 10 of this embodiment, the height H of the projections P is small and the projection number N is large. Thus, there is provided an advantage in uniformity of heat radiation from the outer peripheral surface 10S.

<Method of Manufacturing Cast-Iron Cylindrical Member>

Next, a method of manufacturing the cast-iron cylindrical member of this embodiment is described. First, a composition of cast iron being a material of the cast-iron cylindrical member of this embodiment is not particularly limited, and can be appropriately selected in accordance with the purpose of use of the cast-iron cylindrical member of this embodiment. For example, as a composition of flake graphite cast iron corresponding to JIS FC 250, the following composition can be exemplified in view of wear resistance, seizure resistance, and workability.

C: 3.0 mass % to 3.7 mass %
Si: 2.0 mass % to 2.8 mass %
Mn: 0.5 mass % to 1.0 mass %
P: 0.25 mass % or smaller
S: 0.15 mass % or smaller
Cr: 0.5 mass % or smaller
Balance Fe and Inevitable Impurities In the flake graphite cast iron having the above-mentioned composition, a base organization can be pearlite, a graphite area ratio can be set to 10% or larger, steadite can be set to 2% or smaller as an eutectic hardened material phase, and free ferrite can be set to 5% or smaller as an organization, and a hardness can be set to 94 HRB to 104 HRB, and a tensile strength can be set to 250 MPa or larger as mechanical strengths.

Figure 7:
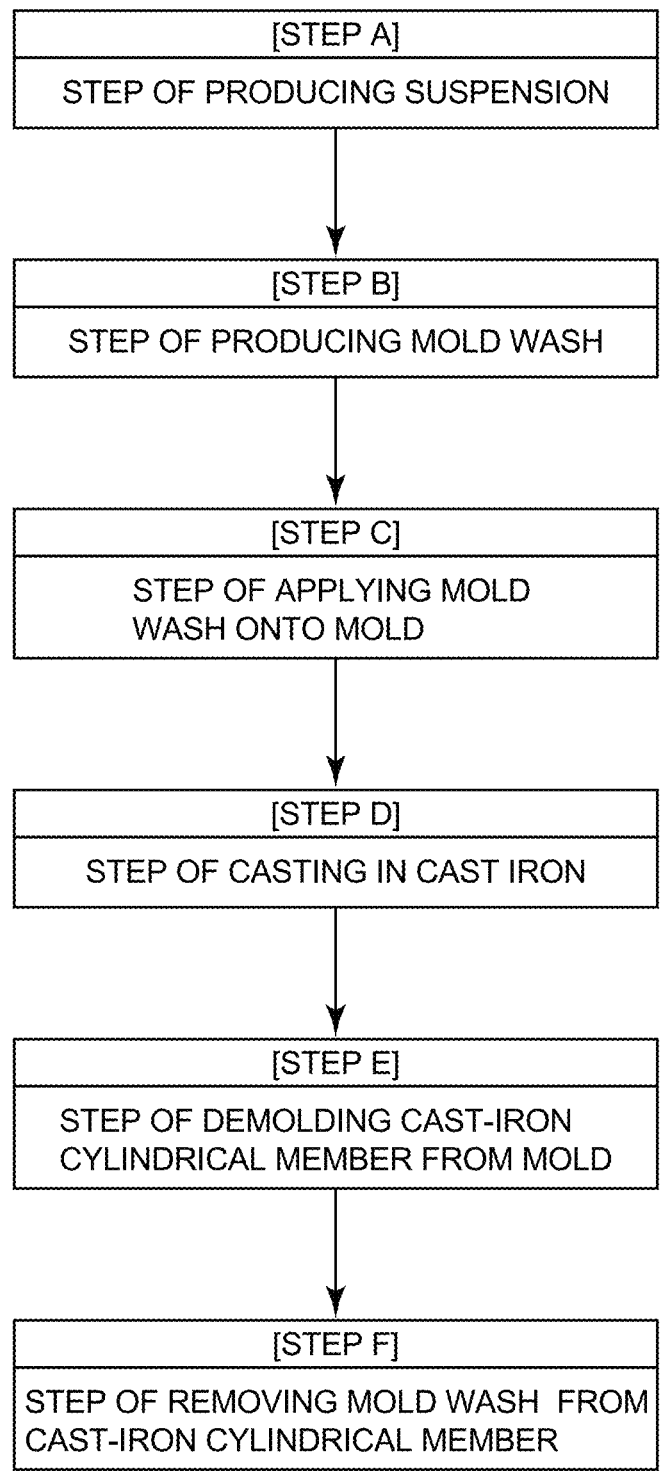
FIG. 7 is a flowchart for illustrating an example of casting steps in a case in which the cast-iron cylindrical member according to this embodiment is manufactured by a centrifugal casting method.

Further, it is preferred that the cast-iron cylindrical member 10 of this embodiment be manufactured by a centrifugal casting method involving [Step A] to [Step F] illustrated in FIG. 7. When the cast-iron cylindrical member 10 having the projections Pn having the constricted shape, which are formed on the outer peripheral surface 10S, is manufactured by centrifugal casting, there arises a problem in that formability of the projections P is lowered to fail to form a sufficient number of the projections P with the height H of the projection P being set smaller than 0.5 mm, as disclosed in Patent Literature 1. Further, as a result of examination on a centrifugal casting method disclosed in Patent Literature 1, the inventors of the present invention have also found a problem in that the margin for formation of the constricted portion in the height direction is also reduced with the reduction in height of the projection P, resulting in difficulty in the formation of the projection Pn having the constricted shape.

Through [Step A] to [Step F] described in detail below, which are obtained by revision of the whole centrifugal casting process, however, the inventors of the present invention have found that a sufficient number of the projections Pn having the constricted shape can be formed when the height of the projections P is equal to or larger than 0.20 mm even if the height H of the projections P is set smaller than 0.5 mm. Further, the inventors of the present invention have found that, when a mold wash having a predetermined composition used in [Step C] and a temperature of a cylindrical die in [Step C], which falls within a predetermined range, are combined with each other, the projections P having the shape elements which are more advantageous for the improvement of the bonding strength can be formed as compared to the related art, in particular, the technology described in Patent Literature 3.

[Step A]

In Step A, a refractory base material, a binder, and water are blended at a predetermined ratio to produce a suspension.

Here, in the centrifugal casting of the cast-iron cylindrical member 10 of this embodiment, it is preferred that selectable ranges as a blending amount of the refractory base material, a blending amount of the binder, and a blending amount of water, and a selectable range as a mean particle diameter of the refractory base material be respectively set as follows.

Blending amount of refractory base material: 25 mass % to 35 mass %
Blending amount of binder: 3 mass % to 9 mass %
Blending amount of water: 62 mass % to 66 mass %
Mean particle diameter of refractory base material: 0.002 mm or larger and 0.010 mm or smaller

[Refractory Base Material]

Through setting of the blending amount of the refractory base material to 25% by mass or larger, an adiabatic effect of a mold wash can be sufficiently ensured. Thus, it becomes easier to obtain the cast-iron cylindrical member 10 having a desired cast-iron base organization. Further, through setting of the blending amount to 35% by mass or smaller, it becomes easier to uniformly apply the mold wash onto an inner peripheral surface of a die without lowering a fluidity of the mold wash. Thus, it becomes easier to ensure accuracy of an outer diameter of the cast-iron cylindrical member 10. Diatom earth can be used as the refractory base material.

[Mean Particle Diameter of Refractory Base Material]

Through setting of the mean particle diameter of the refractory base material to 0.002 mm or larger, it becomes easier to form a sufficient number of the projections Pn having the constricted shape. As a result, it becomes easier to ensure the bonding strength. Further, through setting of the mean particle diameter to 0.010 mm or smaller, an inner peripheral surface of a mold wash layer formed of the mold wash can be prevented from being roughened more than needed. As a result, it becomes easier to smooth the outer peripheral basal surface 10Sb extending around the projection P. Consequently, the adhesion between the outer peripheral basal surface 10Sb and the outer periphery-side member is improved, while it becomes easier to suppress the generation of air gaps at the boundary between the outer peripheral basal surface 10Sb and the outer periphery-side member.

[Binder]

Through setting of the blending amount of the binder to 3% by mass or larger, a binding strength of the binder can be increased. Thus, an increase in height of the formed projections P more than needed can be suppressed. Further, through setting of the blending amount of the binder to 9% by mass or smaller, an increase in number of the formed projections P more than needed can be suppressed. Therefore, the projections P having a height equal to or smaller than a given value can be sufficiently formed. Thus, it becomes easier to ensure sufficient bonding strength. Bentonite can be used as the binder.

[Water]

Through setting of the blending amount of water to 62% by mass or larger, the mold wash is uniformly applied onto the inner peripheral surface of the die without lowering the fluidity of the mold wash. Thus, the accuracy of the outer diameter of the cast-iron cylindrical member 10 is ensured. Further, through setting of the blending amount of water to 66% by mass or smaller, necessary binding strength of the mold wash is ensured to make the formation of the projections P easier.

[Step B]

In Step B, a predetermined amount of surfactant is added to the suspension prepared in Step A to produce the mold wash.

[Surfactant]

It is preferred that the surfactant be added within a range of from 0.005 part by mass to 0.04 part by mass with respect to 100 parts by mass of a mass of the suspension. Through setting of an additive amount of the surfactant to 0.005 part by mass or larger, a foam formation effect of the surfactant in the mold wash layer is sufficiently exerted. Thus, it becomes easier to form the projections P. As a result, it also becomes easier to ensure sufficient bonding strength. Further, through setting of the additive amount of the surfactant to 0.04 part by mass or smaller, the foam formation effect of the surfactant is prevented from becoming excessive. As a result, it becomes easier to form the projection Pn having the constricted shape. Consequently, it becomes easier to ensure sufficient bonding strength. Further, the total number of the formed projections P does not increase more than needed. Thus, it becomes easier to fill, in forming the outer periphery-side member, a portion between the plurality of projections P adjacent to each other on the outer peripheral surface 10S with the raw material for formation of the outer periphery-side member without any space. Thus, the generation of the air gaps at the bonding interface is prevented to make it easier to ensure the adhesion.

[Step C]

Figure 8A:
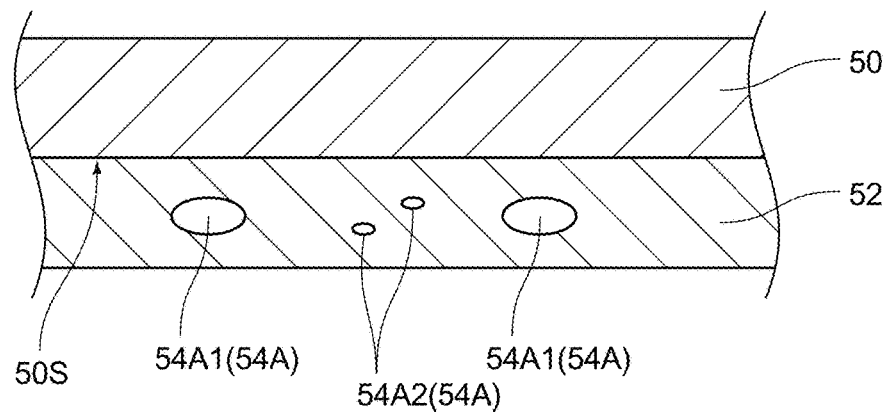
FIG. 8(A) is a view for illustrating a state in which a plurality of air bubbles are formed in a mold wash layer.

In Step C, as illustrated in FIG. 8(A), the mold wash is sprayed to be applied to an inner peripheral surface 50S of a cylindrical die 50 (mold) in a rotating state, which is heated at a temperature of from 180° C. to 240° C. At this time, the mold wash is applied so that a layer of the mold wash (mold wash layer 52) is formed over an entire periphery of the inner peripheral surface 50S at an approximately uniform thickness.

Figure 8B:
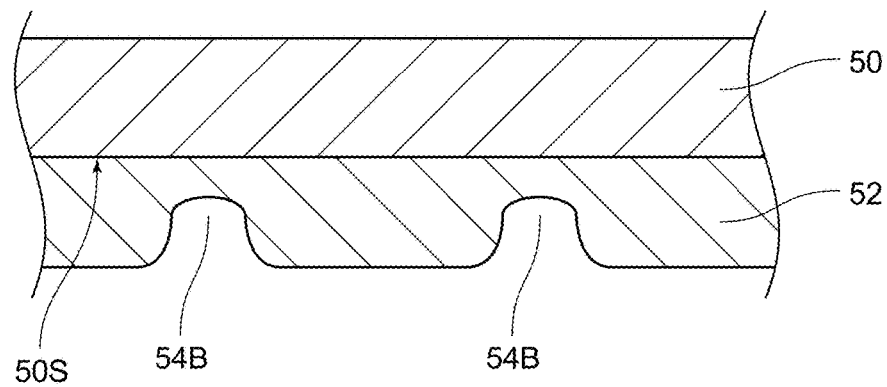
FIG. 8(B) is a view for illustrating a state in which recessed holes are formed on an inner periphery side of the mold wash layer.
Figure 8C:
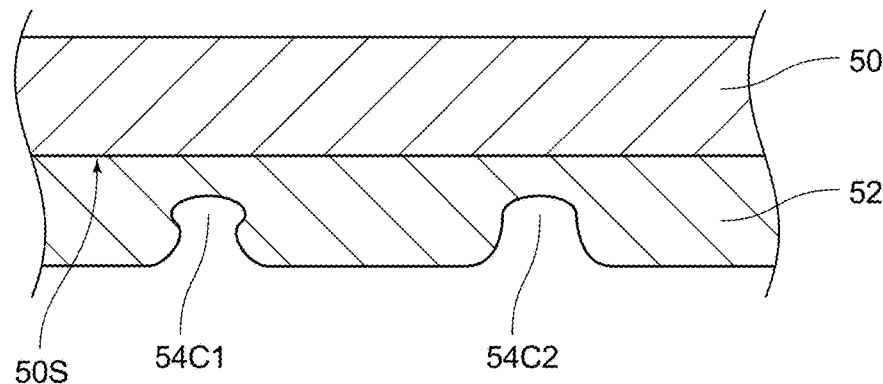
FIG. 8(C) is a view for illustrating a state in which a recessed hole having a constricted shape is formed together with formation of a recessed hole having another shape.

In this case, it is supposed that the projections P are formed through a process described below. First, in the mold wash layer 52 formed on the inner peripheral surface 50S of the cylindrical die 50, moisture content in the mold wash evaporates rapidly to forma plurality of air bubbles 54A (FIG. 8(A)). Next, the surfactant acts on air bubbles 54A1 (54A) having a relatively large size or air bubbles 54A2 (54A) having a relatively small size bind to one another to form recessed holes 54B on an inner periphery side of the mold wash layer 52 (FIG. 8(B)). Then, the mold wash layer 52 is gradually dried from the inner peripheral surface 50S of the cylindrical die 50. During a process in which the mold wash layer 52 in which the recessed holes 54B are formed is gradually solidified from the cylindrical die 50 side, recessed holes 54C1 having a constricted shape are formed in the mold wash layer 52. From some of the recessed holes 54B, recessed holes 54C2 having shapes different from the shape of the recessed holes 54C1 are sometimes formed in the mold wash layer 52 (FIG. 8(C)).

It is preferred that a thickness of the mold wash layer 52 be selected within a range of from 1.4 times to 2.0 times of the height H of the projection P. When the thickness of the mold wash layer 52 falls within the above-mentioned range, it is particularly preferred that the temperature of the cylindrical die 50 be set to 240° C. or lower as described above. When the temperature of the cylindrical die 50 exceeds 240° C., a drying speed for the mold wash layer 52 is high, and therefore the side of the mold wash layer 52, which is closer to the cylindrical die 50, is solidified within a short period of time. At this time, when the surfactant also acts on the small air bubbles 54A2 which are present in the mold wash layer 52 to form the recessed holes 54B in the mold wash layer 52, the small air bubbles 54A2 join together, and hence the projections P having a flat shape with the thin top portion 20T of the projection P appear. The projection P having the top portion 20T in the flat shape is formed on the outer peripheral surface 10S of the cast-iron cylindrical member 10 so that an area of the outer peripheral basal surface 10Sb which is visible from the outer peripheral surface 10S side is reduced. Thus, in forming the outer periphery-side member, it becomes more difficult to apply the raw material for formation of the outer periphery-side member on the outer peripheral surface 10S of the cast-iron cylindrical member 10 without any space. As a result, sufficient bonding strength and adhesion (small gap ratio) cannot be ensured.

Further, in terms of productivity, it is preferred that the temperature of the cylindrical die 50 in Step C have a small temperature difference from the temperature of the cylindrical die 50 in Step E, more specifically, the temperature of the cylindrical die 50 in Step C be equal to 180° C. or higher. In this case, the temperature of the cylindrical die 50 becomes maximum in Step D and Step E at a point of time at which the cast-iron cylindrical member is demolded from the cylindrical die 50 in Step E.

[Step D]

In Step D, after the mold wash layer 52 is dried, cast iron is casted into the cylindrical die 50 in the rotating state. At this time, the molten metal is also filled into the recessed holes 54C1 and 54C2 formed in the mold wash layer 52. As a result, portions corresponding to the projections P of the cast-iron cylindrical member 10 are formed. In the example illustrated in FIG. 8, the recessed hole 54C1 corresponds to the projection Pn having the constricted shape illustrated in FIG. 2 and the recessed hole 54C2 corresponds to the projection Pa having the another shape illustrated in FIG. 3.

When the projection Pn and the projection Pa formed on the outer peripheral surface 10S under the casting conditions described above are viewed from the top surface 10St side, the top surface 10St of each of the projection Pn and the projection Pa tends to have an approximately flat shape, an approximately flat shape with a recess in the center, a choripetalous corolla-like shape, or a choripetalous corolla-like shape with a recess in the center. Further, the entire projection P formed on the outer peripheral surface 10S is made of a casting material. However, the mold wash is present between the recessed holes 54C1 and 54C2 and the cylindrical die 50, and therefore the projection P has an appropriately small sectional area. Thus, graphite tends to precipitate by a larger amount in the portion corresponding to the projection P.

[Step E]

In Step E, after the molten metal is solidified to form the cast-iron cylindrical member 10, the cast-iron cylindrical member 10 is demolded together with the mold was layer 52 from the cylindrical die 50. The temperature of the cylindrical die 50 becomes maximum at this point of time.

[Step F]

In Step F, the mold wash layer 52 is removed from the outer peripheral surface 10S of the cast-iron cylindrical member 10 by a blasting device.

Examples

The present invention is described below by way of examples, but the present invention is not limited only to the following examples. A first test described below is conducted mainly to evaluate effects of the mold wash, whereas a second test described below is conducted mainly to evaluate effects of the temperature of the die.

<First Test>

1. Manufacture of Cast-Iron Cylindrical Member

Cast-iron cylindrical members of Examples and Comparative Examples were manufactured by centrifugal casting with the use of a molten metal having the same composition. A composition of the casted cast-iron cylindrical members was: C: 3.4% by mass, Si: 2.4% by mass, Mn: 0.7% by mass, P: 0.12% by mass, S: 0.035% by mass, Cr: 0.25% by mass, and the balance Fe and inevitable impurities (corresponding to JIS FC250). For the centrifugal casting, the mold wash shown in Table 1 was used.

Mold washes A1 to A5 used to manufacture the cast-iron cylindrical members of Examples satisfy the suitable mold wash composition and mean particle diameter of the refractory base material produced in Step A and Step B described above. On the other hand, mold washes B1 to B5 used to manufacture the cast-iron cylindrical members of Comparative Examples described later do not satisfy any of the suitable mold wash composition and mean particle diameter of the refractory base material produced in Step A and Step B described above. The mold wash B1 was prepared in accordance with the composition of a mold wash used in Example 1 of Patent Literature 1 except that the additive amount of the surfactant was changed to be the same as that of the mold washes A1 to A5.

Regardless of which of the mold washes was used to manufacture the cast-iron cylindrical member, the mold wash layer 52 was formed at the temperature of the cylindrical die 50 in Step C set within the range of from 180° C. to 240° C. However, a thickness of the mold wash layer 52 was appropriately changed in Examples and Comparative Examples. Further, in manufacturing the cast-iron cylindrical members of Examples, the thickness of the mold wash layer 52 formed by using the same kind of mold wash was set to three levels, thereby manufacturing the cast-iron cylindrical members having the projections P with the different heights H. Further, for the steps after Step D, the same conditions were used to manufacture all the cast-iron cylindrical members of Examples and Comparative Examples. Thereafter, the inner peripheral surface of each of the obtained cast-iron cylindrical members was subjected to cutting to adjust the thickness to 5.5 mm.

Each of the cast-iron cylindrical members of Examples and Comparative Examples obtained through the process described above had an outer diameter that is an outer diameter including the height H of the projections P of 85 mm, an inner diameter of 74 mm with the thickness of 5.5 mm, and an axial length of 130 mm as dimensions. The

TABLE 1

| | Composition of mold wash | | | | |
|---|---|---|---|---|---|
| | Composition of suspension | | | | |
| Kind of mold wash | Diatom earth [% by mass] | Mean particle diameter of diatom earth [mm] | Bentonite [% by mass] | Water [% by mass] | Surfactant *1 [part by mass] |
| A1 | 25 | 0.006 | 9 | Remaining amount of suspension component | 0.02 |
| A2 | 27.5 | 0.006 | 7.5 | Remaining amount of suspension component | 0.02 |
| A3 | 30 | 0.006 | 6 | Remaining amount of suspension component | 0.02 |
| A4 | 32.5 | 0.006 | 4.5 | Remaining amount of suspension component | 0.02 |
| A5 | 35 | 0.006 | 3 | Remaining amount of suspension component | 0.02 |
| B1 | 27.5 | 0.012 | 6 | Remaining amount of suspension component | 0.02 |
| B2 | 25 | 0.006 | 9 | Remaining amount of suspension component | 0.045 |
| B3 | 35 | 0.006 | 3 | Remaining amount of suspension component | 0.002 |
| B4 | 25 | 0.006 | 11 | Remaining amount of suspension component | 0.02 |
| B5 | 25 | 0.001 | 3 | Remaining amount of suspension component | 0.02 |

(Note)
*1 indicates additive amount to 100 parts by mass of suspension.

composition and the dimensions of each of the cast-iron cylindrical members of Examples and Comparative Examples manufactured as evaluation samples allow uses as the cylinder liner.

2. Various Measurement Methods

Next, for the cast-iron cylindrical members of Examples and Comparative Examples, the following values [a] to [f] were measured. Measurement methods thereof are described below.

[a] Height H of projection P
[b] Projection number N
[c] Constriction ratio NP
[d] Area ratio S1
[e] Air gap ratio G
[f] Bonding strength F (bonding strength F (Al))

[a] Height H of Projection P

A height h of the projection P, that is, a distance from the outer peripheral basal surface 10Sb to the highest portion of the top surface 10St of the projection P formed on the outer peripheral surface of each of the cast-iron cylindrical members of Examples and Comparative Examples was measured with a dial depth gauge with a minimum unit of 0.01 mm. The dial depth gauge had a needle-like gauge head and a base surface having a width of 16.0 mm, specifically, 14.5 mm except for a rounded portion. The base surface served as a measurement reference surface to be brought into contact with a measured object. The measurement was carried out under a state in which a width direction of the base surface of the dial depth gauge was parallel to the center axis direction of the cast-iron cylindrical member and the gauge head was perpendicular to the outer peripheral surface of the cast-iron cylindrical member. The measurement was carried out at both axial end portions of each of the cast-iron cylindrical members of Examples and Comparative Examples. At this time, the measurement was carried out at two positions opposed to each other in a diameter direction at one end, and at two positions opposed to each other in the diameter direction at another end. However, the positions at the another end are rotated by 90 degrees in a peripheral direction from the measurement positions at the one end. An average value of the heights h of the projections P obtained at the four positions was determined as the height H of the projection P.

[b] Projection Number N

The projection number N was obtained by measuring the outer peripheral surface of each of the cast-iron cylindrical members of Examples and Comparative Examples by using a non-contact three-dimensional laser measuring apparatus to obtain a 1 cm×1 cm contour map, and then counting the number of regions each of which is surrounded by a contour line at a height of 200 μm in the contour map. A specific measurement method is now described.

Figure 9:
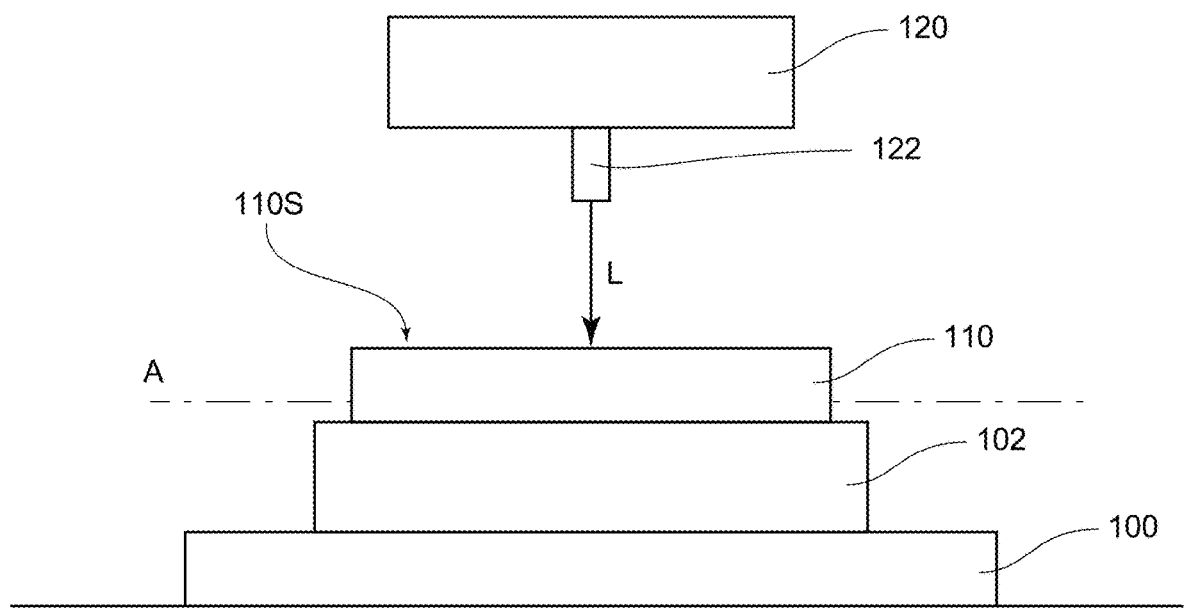
FIG. 9 is a schematic view for illustrating a method of measuring a contour map of projections formed on the outer peripheral surface of the cast-iron cylindrical member and the number of projections by using a non-contact three-dimensional laser measuring apparatus.

First, as illustrated in FIG. 9, an evaluation sample 110 (cast-iron cylindrical member) was placed on a measurement stand 102 (V block) installed on an XY table 100. Next, the XY table 100 was moved in a horizontal direction while a laser beam L was being radiated to an outer peripheral surface 110S of the evaluation sample 110 from a laser radiating portion 122 provided to a bottom portion of a non-contact three-dimensional laser measuring apparatus 120 (laser focus displacement meter: LT series, manufactured by KEYENCE CORPORATION), which was arranged above the evaluation sample 110. In this way, a predetermined area of the outer peripheral surface 110S of the evaluation sample 110 was scanned with the laser beam L. In FIG. 9, an X-axis direction is a direction parallel to the center axis A of the evaluation sample 110. A direction orthogonal to both the X-axis direction and a Z-axis direction (vertical direction), that is, a direction perpendicular to the drawing sheet of FIG. 9 is a Y-axis direction, and the horizontal direction means a direction parallel to an XY plane.

For the measurement, first, coordinates (X, Y)=(0, 0) were set to a position at which the laser beam L, which was radiated in parallel to the Z-axis direction and toward the outer peripheral surface 110S of the evaluation sample 110, was radiated perpendicularly to the outer peripheral surface 110S. Next, in a square measurement area having each side of 1 cm with the coordinates (0, 0) being a center, the XY table 100 was moved at intervals of 0.1 mm for a range of the X axis from −5.0 mm to +5.0 mm and a range of the Y axis from −5.0 mm to +5.0 mm. In this manner, the measurement area of the outer peripheral surface 110S was scanned with the laser beam L. A scanning speed of the laser beam L at this time was 5,500 μm/sec. Here, a position in the Z-axis direction within the measurement area was measured as a coordinate Z at each coordinates (X, Y). A measurement resolution in the Z-axis direction at this time was 0.1 μm. Further, radiation conditions of the laser beam L were a spot diameter of 0.007 mm and a focal depth of 2 mm.

The measurement area had a gentle curve. Corrected coordinate data (X, Y, Z) was accordingly obtained by performing correction processing for flattening the XY plane made up of a curved surface on coordinate data (X, Y, Z) obtained by scanning the laser beam L in the measurement area. Next, the corrected coordinate data (X, Y, Z) was subjected to computation processing with spreadsheet software to be imaged, thereby obtaining a contour image of the measurement area.

Figure 10:
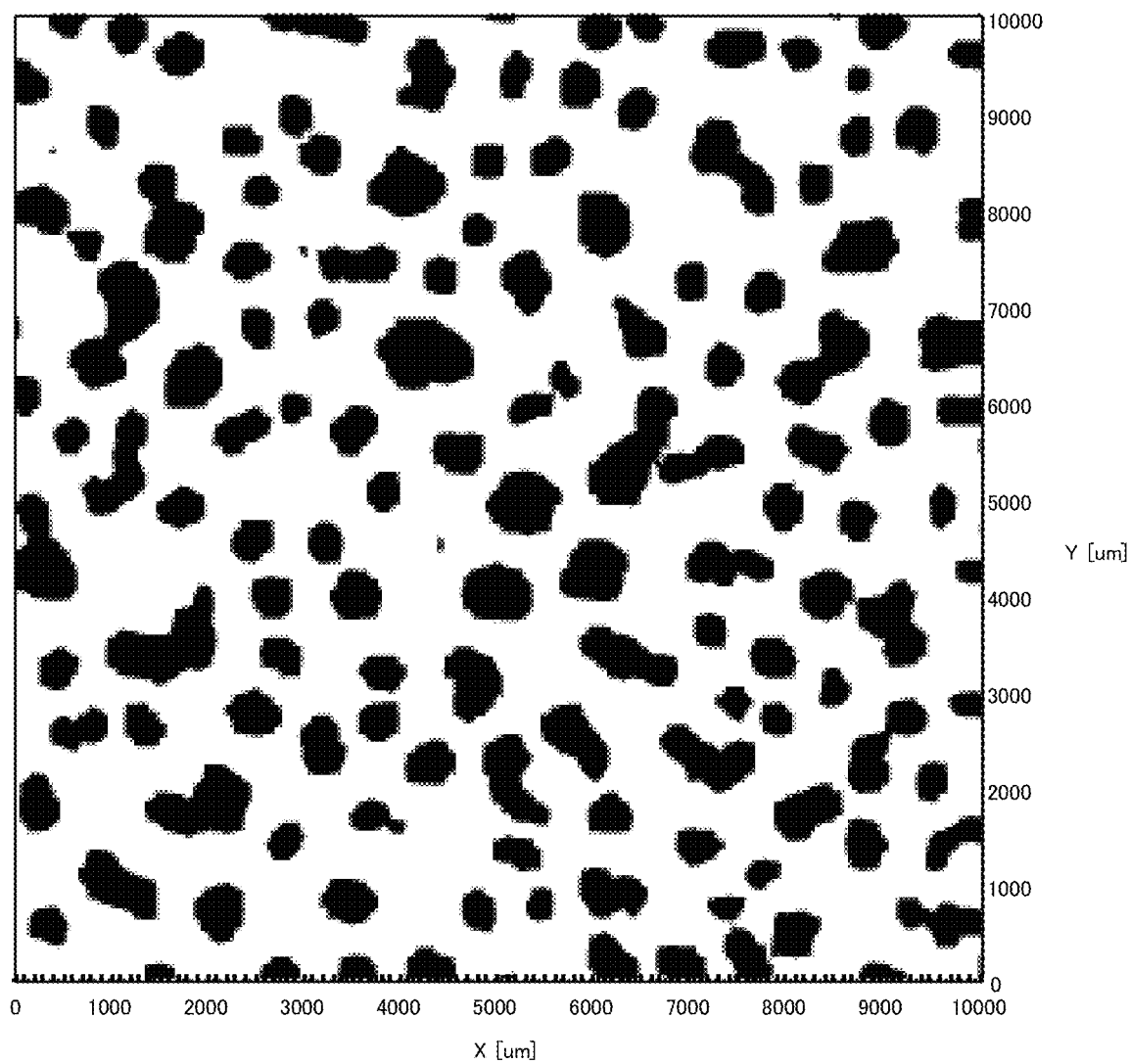
FIG. 10 is an example of a 200-micrometer contour map of an evaluation sample of Example 8.

Then, a Z-axis height of the outer peripheral basal surface 10Sb, which was confirmed in the obtained contour image, was set as a reference value (0 mm), and contour lines at the Z-axis height smaller than 0.20 mm were not displayed. In this manner, a contour map obtained by slicing the measurement area at the Z-axis height of 0.20 mm (200-micrometer contour map) was obtained. For reference, FIG. 10 is an example of the 200-micrometer contour map of the evaluation sample of Example 8. Black regions in FIG. 10 are regions at the Z-axis height of 0.20 mm or higher.

Next, in the 200-micrometer contour map, (i) the number of single closed regions each of which is surrounded only by the contour line at the Z-axis height of 0.20 mm, and (ii) the number of single closed regions each of which is surrounded by the contour line at the Z-axis height of 0.20 mm and a boundary of the 200-micrometer contour map, were counted as the number of the projections P in the measurement area. However, for the counting of the number of the projections P, the following rules (1) to (3) were further applied.

(1) Among (i) the single closed regions each of which is surrounded only by the contour line at the Z-axis height of 0.20 mm, and (ii) the single closed regions each of which is surrounded by the contour line at the Z-axis height of 0.20 mm and the boundary of the 200-micrometer contour map, only regions having a length in the X-axis direction of 0.2 mm or larger and a length in the Y-axis direction of 0.2 mm or larger, that is, having a region area equal to or larger than 0.04 mm² were to be counted in principle.

(2) As an exception of the rule (1), however, when a profile shape of the single closed region in black in the 200-micrometer contour map as exemplified in FIG. 10 was a flat shape or a gourd-like shape, this region was not to be counted. The single closed region having "the flat shape or the gourd-like shape" that is not to be counted is a single closed region having a ratio of a long diameter of the profile shape to a short diameter thereof (long diameter/short diameter) that is equal to or larger than two.

(3) A total number n of the projections P in the measurement area (number/cm$^2$) is calculated based on Expression (6).

$$n = n20 + nb20/2 \quad \text{Expression (6)}$$

In Expression (6), n20 is a total number (number/cm$^2$) of the regions to be counted, each of which is surrounded only by the contour line at the Z-axis height of 0.20 mm, in the 200-micrometer contour map, and nb20 is a total number (number/cm$^2$) of the regions to be counted, each of which is surrounded by the contour line at the Z-axis height of 0.20 mm and the boundary of the 200-micrometer contour map, in the 200-micrometer contour map. Further, in Expression (6), when a value of nb20/2 is not an integer, the value is rounded off to obtain an integer. Thereafter, the total number n of the projections P is calculated.

The above-mentioned measurement was carried out at four measurement points similar to those in the case in which the height H of the projection P was measured. An average value of the total number n of the projections P at the four measurement points was obtained as the projection number N (number/cm$^2$).

[c] Constriction Ratio NP

Figures 11A, 11B:
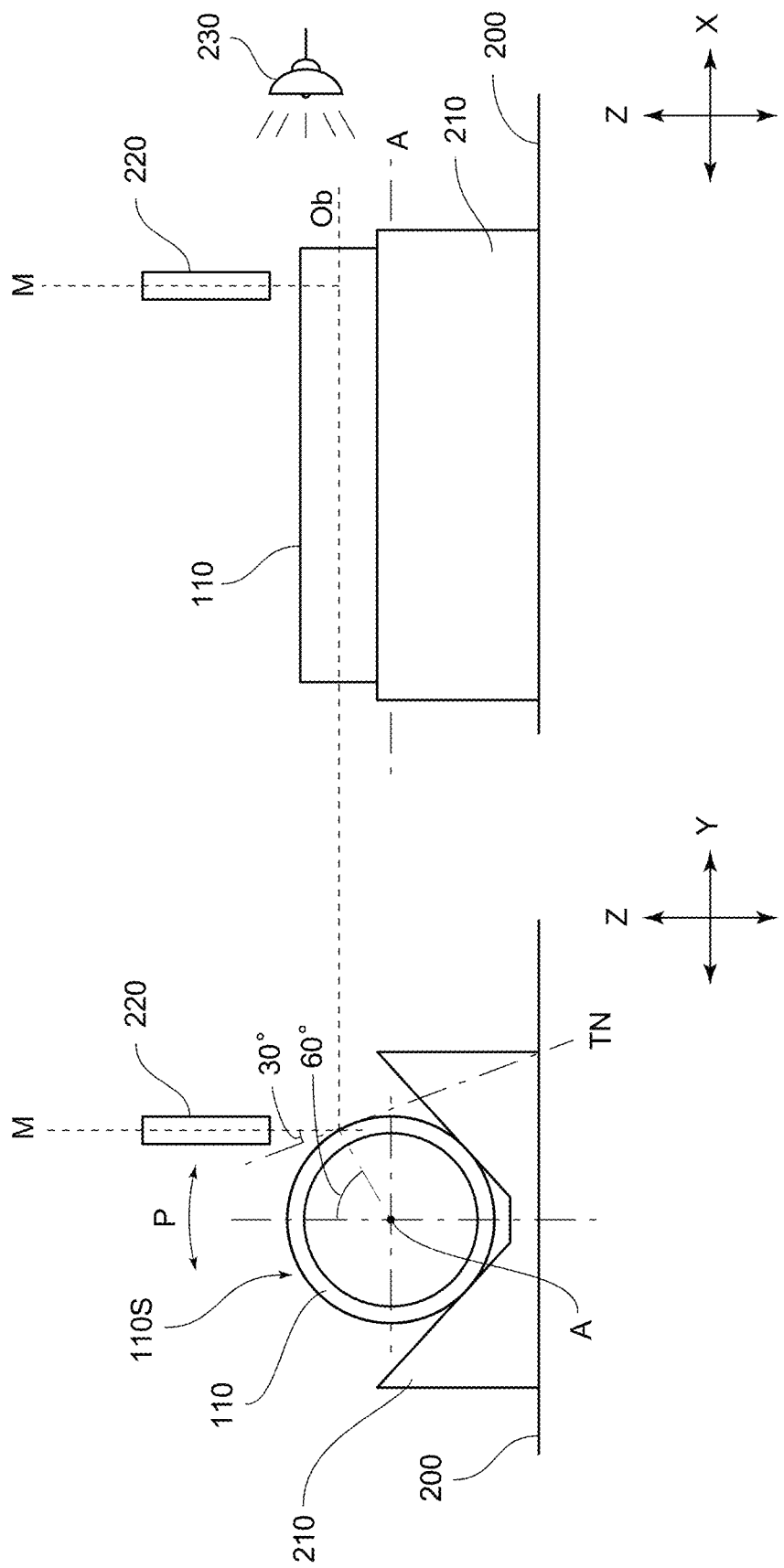
FIG. 11(A) is a front view of an evaluation sample observed by the microscope as viewed from a center axis side and FIG. 11(B) is a side view of the evaluation sample observed by the microscope as viewed from a side surface side.

The constriction ratio NP was obtained in the following procedure. First, as illustrated in FIG. 11, the evaluation sample 110 was arranged on a V-block stand 210 having an approximately V-like sectional shape installed on a horizontal table 200. Further, a microscope 220 (digital microscope KH-1300 manufactured by HIROX Co., Ltd.) connected to a television monitor (not shown in FIG. 11) was arranged obliquely above the evaluation sample 110 so that an optical axis M of the microscope 220 was parallel to the Z-axis direction (vertical direction). When an upper side in the Z-axis direction orthogonal to the center axis A of the evaluation sample 110 was at 0 degree, the microscope 220 was arranged so that a position at about 60 degrees on the outer peripheral surface 110S of the evaluation sample 110 was successfully observed in a peripheral direction P of the evaluation sample 110. In this manner, the tangent TN on the outer peripheral surface 110S of a portion corresponding to the measurement area observed by the microscope 220 and the optical axis M of the microscope 220 were set so as to form an angle of about 30 degrees. Further, an eyepiece of the microscope 220 had 40 magnification power. In FIG. 11, the X-axis direction is a direction parallel to the center axis A of the evaluation sample 110, whereas the Y-axis direction is a direction orthogonal to both the X-axis direction and the Z-axis direction.

Next, an auxiliary light source 230 was arranged slightly above an observed position Ob on the outer peripheral surface 110S of the evaluation sample 110 by the microscope 220 and on a side closer to one end of the evaluation sample 110. From the auxiliary light source 230, light was radiated in a direction approximately parallel to the axial direction A of the evaluation sample 110. At this time, a position of the auxiliary light source 230, a direction of radiation of the light, and the like were finely adjusted so that the light was incident on a side surface of the projection P displayed on the television monitor so as to be reflected thereby.

Subsequently, the position of the evaluation sample 110 arranged on the V-block stand 210 was finely adjusted so that a constricted portion of the projection Pn having the constricted shape was sufficiently confirmed and six or more projections P in focus were successfully observed in a lateral area in a center portion of the television monitor.

Figure 12:
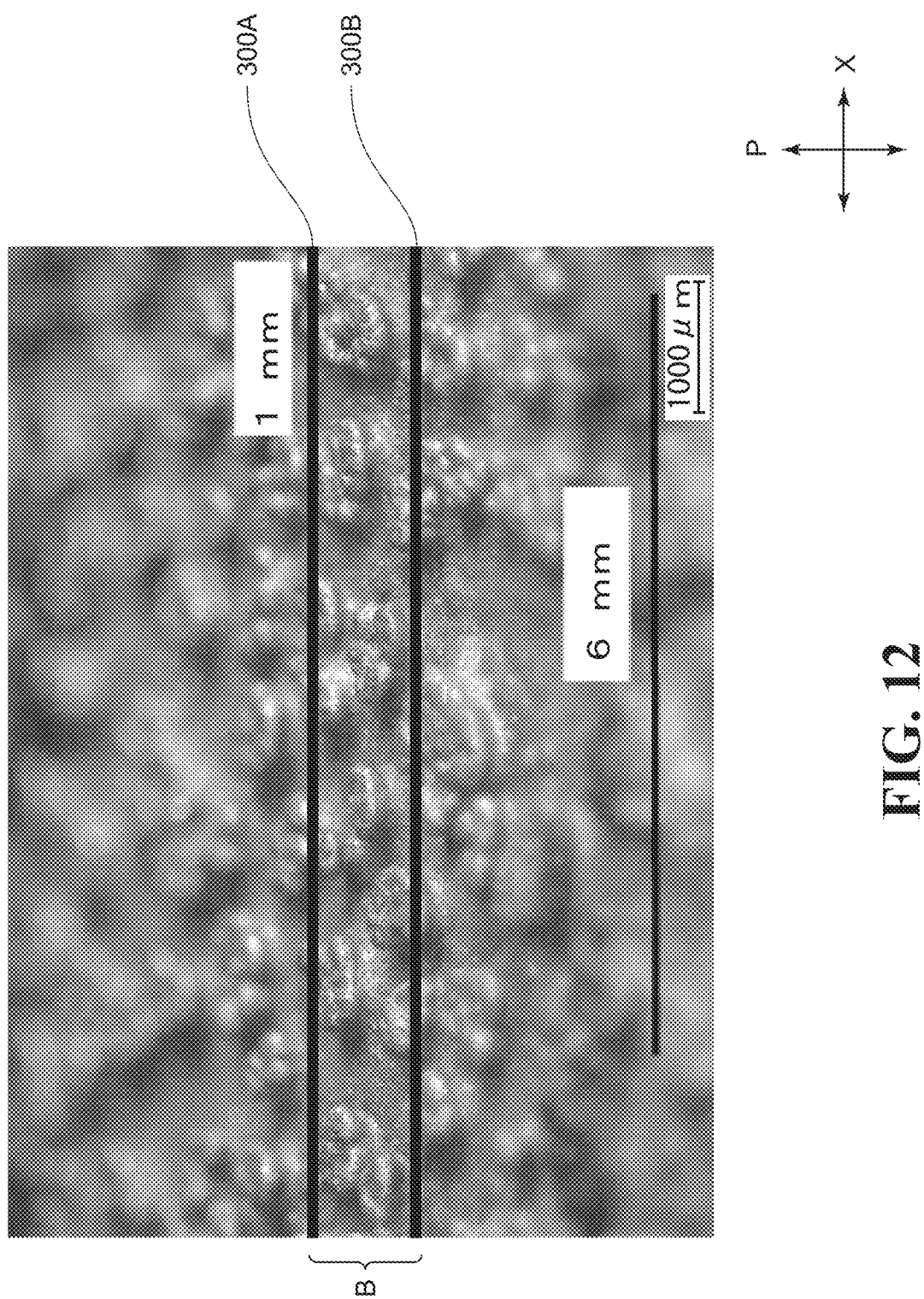
FIG. 12 is an enlarged image for illustrating an example of an outer peripheral surface of the evaluation sample displayed on a television monitor through the microscope in the measurement method illustrated in FIG. 11.

Then, after the fine adjustment, the number of the projections P on the outer peripheral surface 110S of the evaluation sample 110 displayed on the television monitor were counted. FIG. 12 is an enlarged image for showing an example of the outer peripheral surface 110S of the evaluation sample 110 displayed on the television monitor. A longitudinal direction in FIG. 12 is the peripheral direction P of the evaluation sample 110, whereas the lateral direction X in FIG. 12 is a direction parallel to the center axis A of the evaluation sample 110.

In counting the projections P, two cursor lines 300A and 300B parallel to the lateral direction X were displayed on the television monitor at an interval of 1 mm in the peripheral direction P. Then, the above-mentioned focusing was carried out in a band-like measurement region B sandwiched between the two cursor lines 300A and 300B displayed on the television monitor. The television monitor was set so that a region of the outer peripheral surface 110S having a length of at least 6 mm in the lateral direction X was observed. Then, under a condition that 10 or more projections P were observed in the measurement region B, the projections P observed in the measurement region B were marked with two kinds of markers in accordance with whether the projection P was the projection Pn having the constricted shape or the projection Pa having the another shape. Further, at this time, in order to determine whether or not the projection P corresponded to the projection Pn having the constricted shape, the dimensions of the portions of the projection P were measured as exemplified in FIG. 4(B) so as to determine whether or not Expressions (3) to (5) were satisfied. In this manner, in the measurement region B, a number q0 of the projections Pa having the another shape marked with one kind of marker and a number q1 of the projections Pn having the constricted shape marked with another kind of marker were counted.

Figure 13:
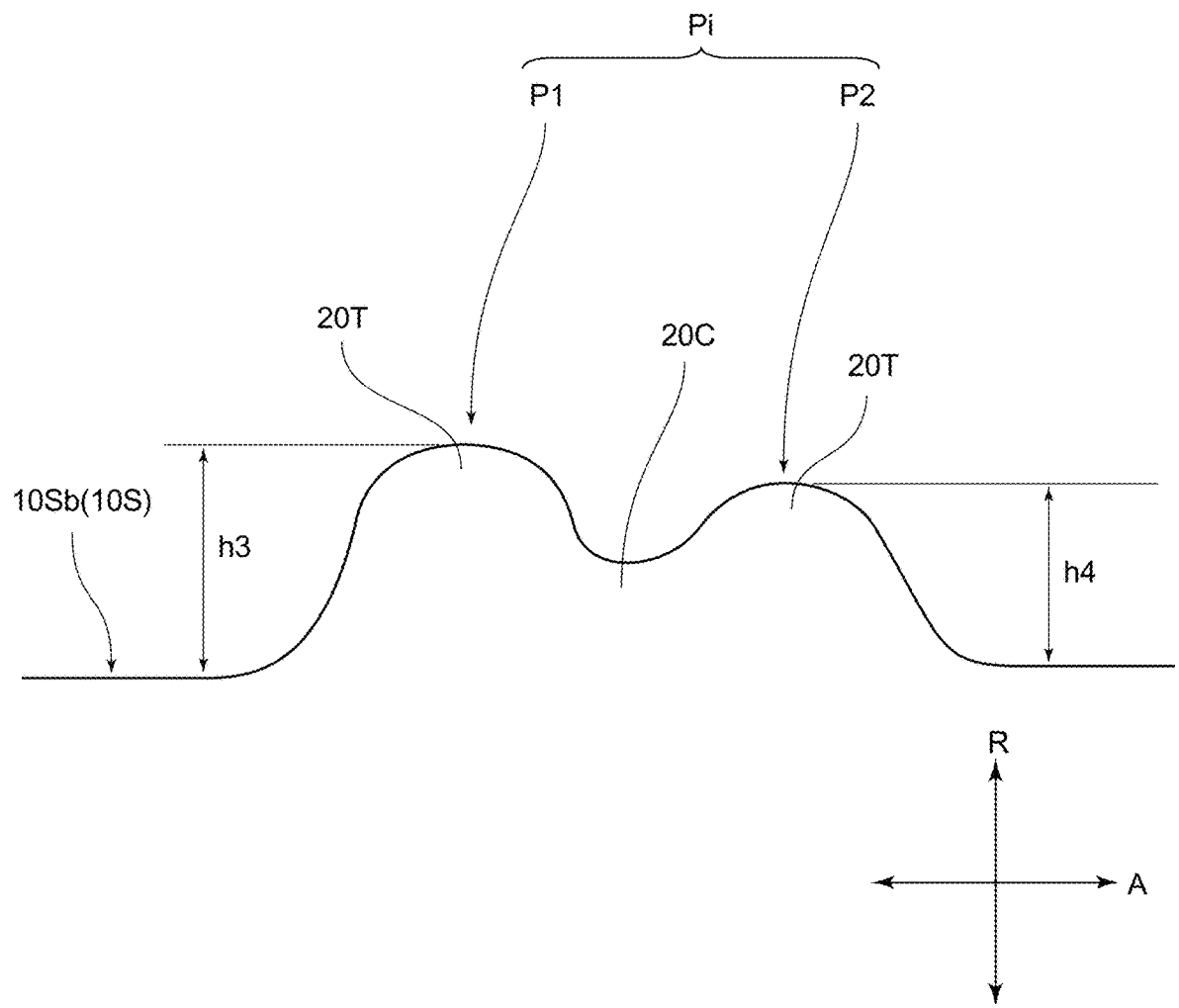
FIG. 13 is a side view for illustrating an example of the projections having irregular shapes.

For the projection P positioned on the cursor line 300A or 300B, the projection P was counted as one only when more than half thereof was present within the measurement region B and was counted as zero in the other cases. Further, as illustrated in FIG. 2 and FIG. 3, the projection P was to be counted only when the entire periphery of the projection P having the single top portion 20T was substantially surrounded only by the outer peripheral basal surface 10Sb so as to be separated from the other projections P. Thus, a projection group Pi as exemplified in FIG. 13 was not to be counted. In the projection group Pi, one projection P1 and another projection P2 are not substantially separated from each other by the outer peripheral basal surface 10Sb so that a portion between the projection P1 and the projection P2 projects with respect to the outer peripheral basal surface 10Sb, and the projections P1 and P2 are coupled to each other by a coupling portion 20C. The coupling portion 20C has a height smaller than a height h3 of the projection P1 and a height h4 of the projection P2.

The measurement described above was carried out at four measurement points similar to those of the measurement of the height H of the projection P. The number q0 of the projections Pa having the another shape and the number q1 of the projections Pn having the constricted shape were obtained at each of the measurement points. Then, the constriction ratio NP was calculated based on Expression (7).

Constriction ratio $NP$ (%)=100×sum of $q1$ at four measurement points/(sum of $q0$ at four measurement points+sum of $q1$ at four measurement points)   Expression (7)

[d] Area Ratio S1

Figure 14:
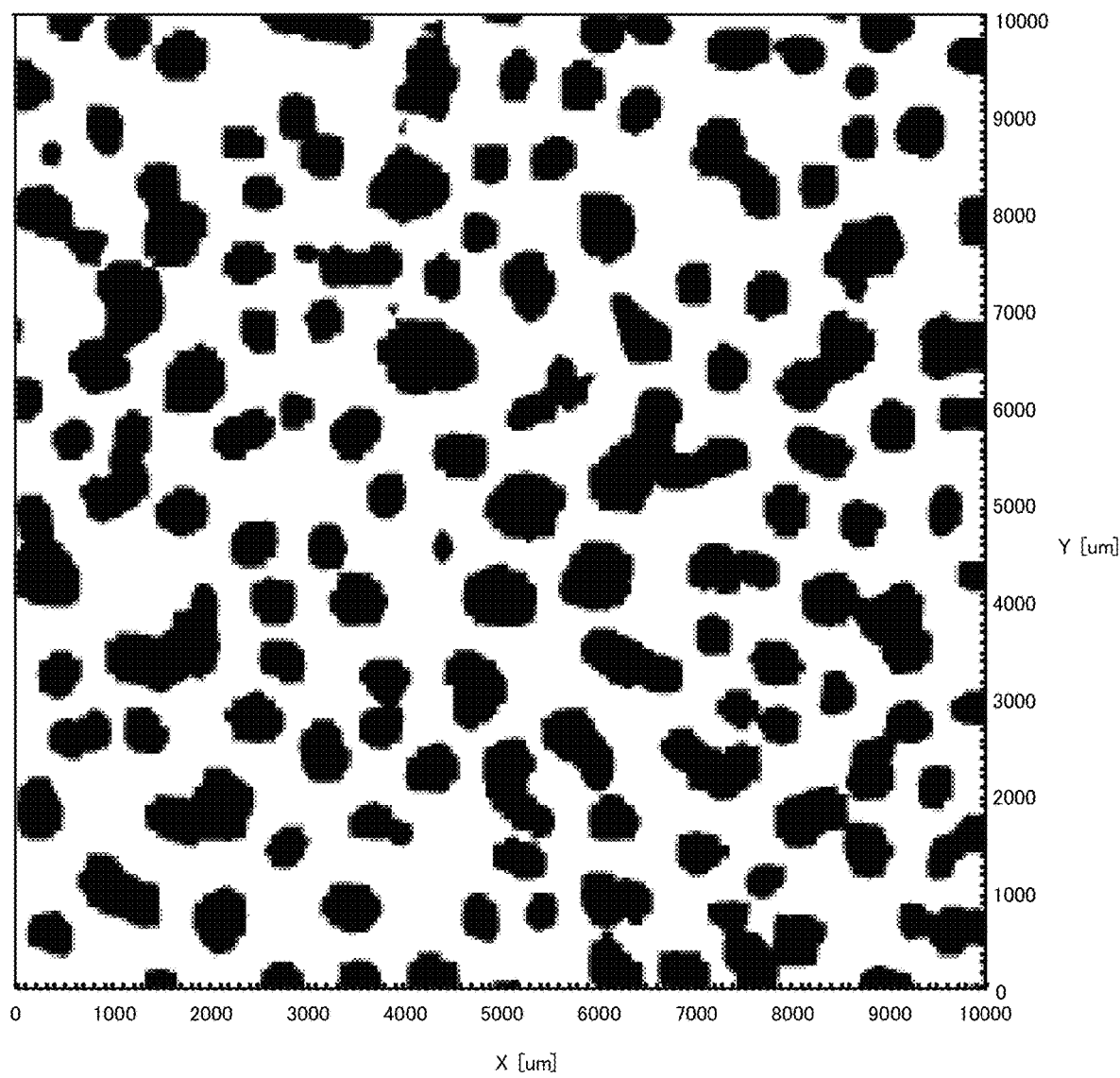
FIG. 14 is an example of a 150-micrometer contour map of the evaluation sample of Example 8.

The area radio S1 was calculated as an average value of area ratios s at the four measurement points through computation with the use of spreadsheet software based on the corrected coordinate data (X, Y, Z) at the four measurement points, which was obtained when the projection number N was measured. The Z-axis height of the outer peripheral basal surface 10Sb confirmed in the contour image drawn with the spreadsheet software was set to the reference value (0 mm), and contour lines at the Z-axis height smaller than 0.15 mm were not displayed. In this manner, a contour map (150-micrometer contour map) obtained by slicing the measurement area at the Z-axis height of 0.15 mm was obtained. For reference, FIG. 14 is an example of the 150-micrometer contour map of the evaluation sample of Example 8. Black regions in FIG. 14 are regions having the Z-axis height of 0.15 mm or higher. The 150-micrometer contour map of FIG. 14 corresponds to a contour map obtained by lowering a slicing position by 50 μm from that of the 200-micrometer contour map of FIG. 10.

The area ratio s at each of the measurement points is a value defined by Expression (8).

Area ratio $s$ (%)=100×$ps$/$bs$   Expression (8)

In Expression (8), in the 150-micrometer contour map having the length of the X axis and the length of the Y axis corresponding to 1 cm (10 mm) of the measurement area, ps is a sum area (mm², sectional area taken at the Z-axis height of 0.15 mm) of (i) areas of the regions each of which is surrounded only by the contour line at the Z-axis height of 0.15 mm, and (ii) areas of regions each of which is surrounded by the contour line at the Z-axis height of 0.15 mm and the boundary of the 150-micrometer contour map. Further, bs is a total area of the 150-micrometer contour map (100 mm²=10 mm×10 mm).

[e] Air Gap Ratio G

Figure 15A:
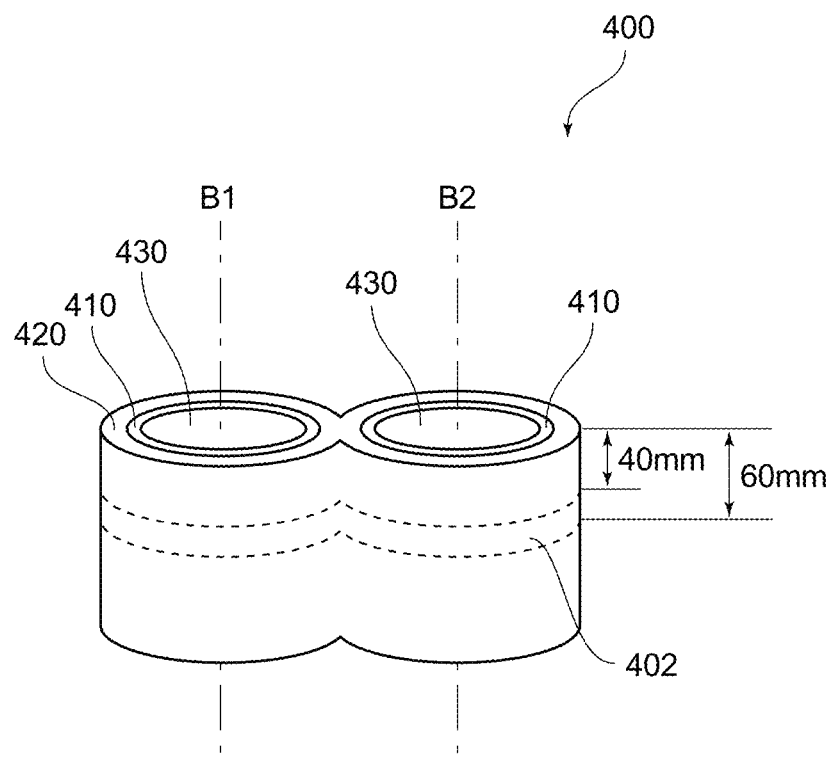
FIG. 15(A) is an external view of the double-type cylinder and FIG. 15(B) is a bottom view of the test piece.
Figure 15B:
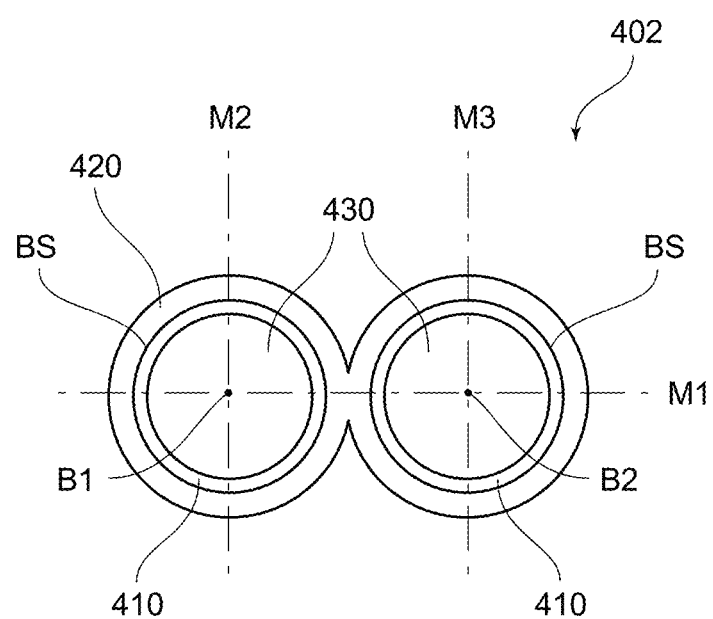

For measurement of an air gap ratio G, double-type cylinders manufactured by using the cast-iron cylindrical members of Examples and Comparative Examples were manufactured. As illustrated in FIG. 15(A), a double-type cylinder 400 was manufactured by casting entire outer peripheral surfaces of two cast-iron cylindrical members 410 (cylinder liners) manufactured as the evaluation samples with an aluminum alloy through die-casting. Die-casting conditions in this case are as follows.

—Die-Casting Conditions—

Aluminum alloy material: ADC12

Casting pressure: 60 MPa

Casting speed: 1.8 m/s

Molten temperature: 675° C.

Thickness of cylinder block 420: 8 mm

Thickness between cylinder bores 430: 15.4=(thickness of an aluminum alloy part between the cylinder bores 430 is 4.4 mm)

Height of cast-iron cylindrical member 410 (cylinder liner): 130 mm

Thickness of cast-iron cylindrical member 410 (cylinder liner): 5.5 mm

Next, a first test piece 402 having a thickness of 20 mm was obtained by cutting the double-type cylinder 400 at a position 40 mm lower and a position 60 mm lower from an upper end surface of the double-type cylinder 400 in a direction orthogonal to a bore center axis B1 and a bore center axis B2 of two cylinder bores 430. Next, of the two cut surfaces of the first test piece 402, the cut surface obtained by cutting at the 60-millimeter position was polished. Then, a boundary portion BS between each of the cast-iron cylindrical members 410 and a cylinder block 420 made of an aluminum alloy on the polished surface was observed with a metallurgical microscope.

The observation of the boundary portion BS was carried out at eight positions (a) to (c) described below in total.

(a) Positions at which a straight line M1 connecting the two bore center axes B1 and B2 and the boundary portion BS cross each other (subtotal of four positions).

(b) Positions at which a straight line M2 that is orthogonal to the straight line M1 and passes through the bore center axis B1, and the boundary portion BS cross each other (subtotal of two positions).

(c) Positions at which a straight line M3 that is orthogonal to the straight line M1 and passes through the bore center axis B2, and the boundary portion BS cross each other (subtotal of two positions).

At each of the observation positions, three continuous sectional photographs (power magnification: ×100) were photographed along the boundary portion BS. Next, based on images obtained by image processing (gray-scaling) of the three sectional photographs, an area of air gaps (air-gap area GA) formed at the boundary portion BS between the cast-iron cylindrical members 410 and the cylinder block 420 in the image to be observed, and a total area SA of the image to be observed were obtained. Here, an air gap ratio g (%) at each of the observation positions was expressed by Expression (9).

$g=GA/SA \times 100$   Expression (9)

Then, an average value of the air gap ratios g at the eight observation positions was obtained as the air gap ratio G.

[f] Bonding Strength F (Bonding Strength F (Al))

From the first test piece 402 used for the evaluation of the air gap ratio G, portions (second test pieces A) described in the following (a) to (c) and a portion (second test piece B) described in the following (d) were cut out.

(a) Portions which have a width of 20 mm and are obtained by cutting the first test piece 402 at both longitudinal ends of the first test piece 402 along the peripheral direction with a center being a portion at which the first test piece 402 and the straight line M1 cross each other (subtotal of two positions).

(b) Portions which have a width of 20 mm and are obtained by cutting the first test piece 402 at both transverse ends of the first test piece 402 along the peripheral direction with a center being a portion at which the first test piece 402 and the straight line M2 cross each other (subtotal of two positions).

(c) Portions which have a width of 20 mm and are obtained by cutting the first test piece 402 at both transverse ends of the first test piece 402 along the peripheral direction with a center being a portion at which the first test piece 402 and the straight line M3 cross each other (subtotal of two positions).

(d) A portion which has a width of 20 mm and is obtained by cutting the first test piece 402 along a transverse direction in a central portion of the first test piece 402 in the longitudinal direction (portion corresponding to a portion between the cylinder bores 430) (subtotal of one position).

The second test piece A is a cut piece having a double-layered structure including a portion of the cast-iron cylindrical member 410, which forms a concave surface on one surface side, and a portion of the cylinder block 420, which forms a convex surface on another surface side. Further, the second test piece B is a cut piece having a triple-layered structure. Layers on both sides are portions of the cast-iron cylindrical members 410 each of which forms a concave surface, whereas an intermediate layer integrated with the layers on both sides is a portion of the cylinder block 420.

Next, arms for tensile test, which respectively have adhesive surfaces corresponding to the concave and convex shapes of both surfaces of each of the second test pieces A and B, were bonded to both the surfaces of each of the second test pieces A and B. Then, with the use of a tensile testing machine (universal testing machine: AG-5000E manufactured by Shimadzu Corporation), under a state in which one of the two arms respectively bonded to both the surface of each of the second test pieces A and B was held and fixed with a cramp, a tensile load was applied to another arm in a direction approximately orthogonal to a bonding interface between the cast-iron cylindrical member 410 and the cylinder block 420. Here, the tensile load, at which the portion of the cast-iron cylindrical member 410 and the portion of the cylinder block 420 that make up each of the second test pieces A and B were separated from each other, was measured as a bonding strength f. Then, an average value of the bonding strengths f of the six second test pieces A and the bonding strength f of the single second test piece B was obtained as the bonding strength F. The bonding strength F is also the bonding strength F (Al) which is to be compared to the boundary bonding strength Fb.

Results of measurement of the cast-iron cylindrical members of Examples and Comparative Examples by the measurement methods described above are shown in Table 2 and Table 3.

TABLE 2

| | Kind of mold wash | Area ratio S1 (*1) [%] | Height H of projection P [mm] | Projection number N (*2) [number/cm²] | Constriction ratio NP [%] | Bonding strength index S $S = H^2 \times N \times NP$ | Boundary bonding strength Fb $Fb = 1.325 \times H^2 \times N - 0.75$ |
|---|---|---|---|---|---|---|---|
| Example 1 | A1 | 15 | 0.20 | 180 | 55.5 | 399.6 | 8.8 |
| Example 2 | A1 | 15 | 0.25 | 114 | 66.1 | 471.0 | 8.7 |
| Example 3 | A1 | 15 | 0.30 | 79 | 74.1 | 526.9 | 8.7 |
| Example 4 | A2 | 20 | 0.25 | 151 | 67.6 | 638.0 | 11.8 |
| Example 5 | A2 | 20 | 0.30 | 110 | 76.4 | 756.4 | 12.4 |
| Example 6 | A2 | 20 | 0.35 | 78 | 81.8 | 781.6 | 11.9 |
| Example 7 | A3 | 32 | 0.30 | 162 | 81.0 | 1181.0 | 18.6 |
| Example 8 | A3 | 32 | 0.35 | 118 | 92.3 | 1334.2 | 18.4 |
| Example 9 | A3 | 32 | 0.40 | 90 | 92.2 | 1327.7 | 18.3 |
| Example 10 | A4 | 43 | 0.35 | 145 | 87.9 | 1561.3 | 22.8 |
| Example 11 | A4 | 43 | 0.40 | 113 | 93.2 | 1685.1 | 23.2 |
| Example 12 | A4 | 43 | 0.45 | 88 | 98.6 | 1757.1 | 22.9 |
| Example 13 | A5 | 50 | 0.40 | 118 | 94.7 | 1787.9 | 24.3 |
| Example 14 | A5 | 50 | 0.45 | 91 | 98.4 | 1813.3 | 23.7 |
| Example 15 | A5 | 50 | 0.49 | 61 | 99.4 | 1455.8 | 18.7 |
| Comparative Example 1 | B1 | 47 | 0.40 | 31 | 61.3 | 304.0 | 5.8 |
| Comparative Example 2 | B2 | 17 | 0.20 | 232 | 27.6 | 256.0 | 11.5 |
| Comparative Example 3 | B3 | 30 | 0.20 | 20 | 0.0 | 0.0 | 0.3 |
| Comparative Example 4 | B4 | 55 | 0.17 | 0 | 0.0 | 0.0 | — |
| Comparative Example 5 | B5 | 15 | 0.20 | 147 | 15.6 | 92.0 | 7.0 |
| Comparative Example 6 | A5 | 50 | 0.51 | 61 | 96.8 | 1535.8 | — |

(Notes) In Table 2, *1 is measured on 150-micrometer contour map, and *2 is measured on 200-micrometer contour map.
Fb is calculated only for range: 0.2 mm ≤ H < 0.5 mm.

TABLE 3

| | Bonding strength F (bonding strength F (Al)) [MPa] | Magnitude relationship between Fb and F (Al) | Evaluation of bonding strength A, B, C | Air gap ratio G [%] | Evaluation of air gap ratio A, B, C | Evaluation of thickness reduction A, B, C |
|---|---|---|---|---|---|---|
| Example 1 | 9.8 | Fb < F (Al) | B | 0.48 | A | A |
| Example 2 | 10.8 | Fb < F (Al) | A | 0.37 | A | A |
| Example 3 | 11.7 | Fb < F (Al) | A | 0.26 | A | A |
| Example 4 | 13.3 | Fb < F (Al) | A | 0.41 | A | A |
| Example 5 | 15.0 | Fb < F (Al) | A | 0.32 | A | A |
| Example 6 | 15.5 | Fb < F (Al) | A | 0.24 | A | A |
| Example 7 | 21.5 | Fb < F (Al) | A | 0.39 | A | A |
| Example 8 | 23.7 | Fb < F (Al) | A | 0.28 | A | A |
| Example 9 | 23.6 | Fb < F (Al) | A | 0.14 | A | A |
| Example 10 | 27.1 | Fb < F (Al) | A | 0.38 | A | A |
| Example 11 | 28.9 | Fb < F (Al) | A | 0.32 | A | A |

TABLE 3-continued

|  | Bonding strength F (bonding strength F (Al)) [MPa] | Magnitude relationship between Fb and F (Al) | Evaluation of bonding strength A, B, C | Air gap ratio G [%] | Evaluation of air gap ratio A, B, C | Evaluation of thickness reduction A, B, C |
|---|---|---|---|---|---|---|
| Example 12 | 30.0 | Fb < F (Al) | A | 0.23 | A | B |
| Example 13 | 30.4 | Fb < F (Al) | A | 0.58 | B | A |
| Example 14 | 30.8 | Fb < F (Al) | A | 0.52 | B | B |
| Example 15 | 25.5 | Fb < F (Al) | A | 0.47 | A | B |
| Comparative Example 1 | 5.4 | Fb > F (Al) | C | 0.18 | A | A |
| Comparative Example 2 | 4.8 | Fb > F (Al) | C | 0.87 | B | A |
| Comparative Example 3 | 2.3 | Fb < F (Al) | C | 0.28 | A | A |
| Comparative Example 4 | 2.7 | — | C | 1.34 | C | A |
| Comparative Example 5 | 2.8 | Fb > F (Al) | C | 0.42 | A | A |
| Comparative Example 6 | 27.3 | — | A | 0.48 | A | C |

Evaluation criteria for the evaluation of the thickness reduction, the evaluation of the air gap ratio, and the evaluation of the bonding strength, which are shown in Table 3, are as follows.

—Evaluation Criterion for Evaluation of Thickness Reduction—

A: The height H of the projection P is equal to or larger than 0.2 mm and smaller than 0.45 mm.

B: The height H of the projection P is equal to or larger than 0.45 mm and smaller than 0.5 mm.

C: The height H of the projection P is equal to or larger than 0.5 mm.

—Evaluation Criterion for Evaluation of Air Gap Ratio—

A: The air gap ratio G is equal to or smaller than 0.5%.

B: The air gap ratio G is larger than 0.5% and equal to or smaller than 1.0%.

C: The air gap ratio G is larger than 1.0%.

—Evaluation Criterion for Evaluation of Bonding Strength—

A: The bonding strength F is equal to or larger than 10.0 MPa.

B: The bonding strength F is equal to or larger than 6.0 MPa and smaller than 10.0 MPa.

C: The bonding strength F is smaller than 6.0 MPa.

<Second Test>

Cast-iron cylindrical members of Examples and Comparative Examples were obtained in the same manner as in the first test except that the mold wash, the temperature of the cylindrical die 50 in Step C, and the mold wash layer 52 were combined under the conditions shown in Table 4. Results of various measurements and evaluations which were conducted in the same manner as in the first test for the cast-iron cylindrical members of Examples and Comparative Examples are shown in Table 4 and Table 5. Further, when the ratio (hw/h1) of the height hw of the position of the most constricted portion to the height h1 of the projection Pn having the constricted shape is classified into ranges: 0<hw/h1≤0.35, 0.35<hw/h1≤0.65, and 0.65<hw/h1<1.0, the ratios A, B, C of the projections Pn in the respective categories are shown in Table 6. In Table 6, the ratio NP2 and the temperature of the cylindrical die 50 are also shown.

TABLE 4

|  | Kind of mold wash | Temperature of cylindrical die [° C.] | Thickness of mold wash layer [mm] | Area ratio S1 (*1) [%] | Height H of projection P [mm] | Projection number N (*2) [number/cm$^2$] | Constriction ratio NP [%] | Bonding strength index S $S = H^2 \times N \times NP$ | Boundary bonding strength Fb $Fb = 1.325 \times H^2 \times N - 0.75$ |
|---|---|---|---|---|---|---|---|---|---|
| Example 16 | A1 | 200 | 0.5 | 16 | 0.25 | 115 | 60.0 | 431.3 | 8.8 |
| Example 17 | A3 | 200 | 0.6 | 33 | 0.35 | 117 | 73.5 | 1053.5 | 18.2 |
| Example 18 | A5 | 200 | 0.7 | 51 | 0.46 | 92 | 78.3 | 1523.5 | 25.0 |
| Example 19 | A1 | 240 | 0.5 | 15 | 0.25 | 114 | 59.5 | 423.9 | 8.7 |
| Example 20 | A3 | 240 | 0.6 | 32 | 0.35 | 118 | 73.8 | 1066.8 | 18.4 |
| Example 21 | A5 | 240 | 0.7 | 50 | 0.45 | 91 | 78.7 | 1450.2 | 23.7 |
| Comparative Example 7 | A1 | 280 | 0.5 | 14 | 0.24 | 129 | 59.7 | 443.5 | 9.1 |
| Comparative Example 8 | A3 | 280 | 0.6 | 30 | 0.34 | 130 | 74.6 | 1121.3 | 19.2 |
| Comparative Example 9 | A5 | 280 | 0.7 | 48 | 0.43 | 102 | 78.4 | 1479.2 | 24.2 |

(Notes) In Table 4, *1 is measured on 150-micrometer contour map, and *2 is measured on 200-micrometer contour map.
Temperature of cylindrical die is a temperature obtained at start of application of mold wash onto cylindrical die.

TABLE 5

|  | Bonding strength F (bonding strength F (Al)) [MPa] | Magnitude relationship between Fb and F (Al) | Evaluation of bonding strength, A, B, C | Air gap ratio G [%] | Evaluation of air gap ratio, A, B, C | Evaluation of thickness reduction, A, B, C |
|---|---|---|---|---|---|---|
| Example 16 | 11.3 | Fb < F (Al) | A | 0.48 | A | A |
| Example 17 | 21.2 | Fb < F (Al) | A | 0.39 | A | A |
| Example 18 | 26.8 | Fb < F (Al) | A | 0.58 | B | B |
| Example 19 | 9.6 | Fb < F (Al) | B | 0.37 | A | A |
| Example 20 | 19.6 | Fb < F (Al) | A | 0.28 | A | A |
| Example 21 | 24.8 | Fb < F (Al) | A | 0.52 | B | B |
| Comparative Example 7 | 4.3 | Fb > F (Al) | C | 1.65 | C | A |
| Comparative Example 8 | 13.7 | Fb > F (Al) | A | 1.86 | C | A |
| Comparative Example 9 | 18.7 | Fb > F (Al) | A | 1.95 | C | A |

TABLE 6

|  | Temperature of cylindrical die [° C.] | Ratio (%) of projection Pn having constricted shape with hw/h1 falling within predetermined range | | | | |
|---|---|---|---|---|---|---|
|  |  | A  0 < hw/h1 ≤ 0.35 | B  0.35 < hw/h1 ≤ 0.65 | C  0.65 < hw/h1 < 1.0 | A + B (ratio NP2)  0 < hw/h1 ≤ 0.65 | A + B + C  0 < hw/h1 < 1.0 |
| Example 16 | 200 | 25.0 | 25.0 | 50.0 | 50.0 | 100.0 |
| Example 17 | 200 | 23.6 | 35.4 | 41.0 | 59.0 | 100.0 |
| Example 18 | 200 | 18.8 | 43.8 | 37.5 | 62.5 | 100.0 |
| Example 19 | 240 | 25.0 | 25.0 | 50.0 | 50.0 | 100.0 |
| Example 20 | 240 | 22.2 | 33.3 | 44.4 | 55.6 | 100.0 |
| Example 21 | 240 | 17.4 | 41.0 | 41.7 | 58.3 | 100.0 |
| Comparative Example 7 | 280 | 10.4 | 10.4 | 79.2 | 20.8 | 100.0 |
| Comparative Example 8 | 280 | 10.4 | 15.3 | 74.3 | 25.7 | 100.0 |
| Comparative Example 9 | 280 | 6.3 | 13.9 | 79.9 | 20.1 | 100.0 |

(Notes) Ratio hw/h1 represents ratio of height hw of position of constricted portion to height h1 of individual projection Pn having constricted shape.
Temperature of cylindrical die is a temperature obtained at start of application of mold wash onto cylindrical die.

[g] Ratios A, B, C, and NP2

The ratios A, B, and C shown in Table 6 were obtained in the following procedure. First, the cast-iron cylindrical member of each of Examples and Comparative Examples was cut at positions 20 mm to 30 mm away from both end portions so that cross sections orthogonal to the axial direction were exposed. Next, cut surfaces were polished using polishing paper while changing a roughness of the polishing paper in the order of medium, fine, and extra fine (1000-grid or higher). The polishing treatment was conducted for three cast-iron cylindrical members to manufacture six measurement samples each having a thickness ranging from 20 mm to 30 mm with a polished cut surface.

Next, a sectional shape of each of the projections Pn having the constricted shape, which were present in an outer peripheral end of the polished cut surface, was observed with the microscope 220 (digital microscope KH-1300 manufactured by HIROX Co., Ltd., an eyepiece magnification: 100-fold magnification) connected to a television monitor with analysis software. At this time, for the observed sectional shape of the individual projection Pn having the constricted shape, the height h1 and the height hw of the position of the most constricted portion were measured. Twenty-four projections Pn having the constricted shape were randomly selected for each measurement sample, and therefore, in total, the sectional shapes of 144 projections Pn having the constricted shape were observed.

Then, after the 144 projections Pn having the constricted shape were classified into the category A (0<hw/h1≤0.35), the category B (0.35<hw/h1≤0.65), and the category C (0.65<hw/h1<1.0) for the ratio (hw/h1), the number of projections Pn having the constricted shape falling into each of the categories was obtained. Then, the number of projections Pn having the constricted shape falling into each of the categories was divided by the total number (144) of projections to be observed to obtain the ratios A, B, and C shown in Table 6. Further, from a sum of the ratio A and the ratio B, the ratio NP2 was also obtained.

<Evaluation of Relationship Between Bonding Strength and Various Shape Parameters>

Figure 16:
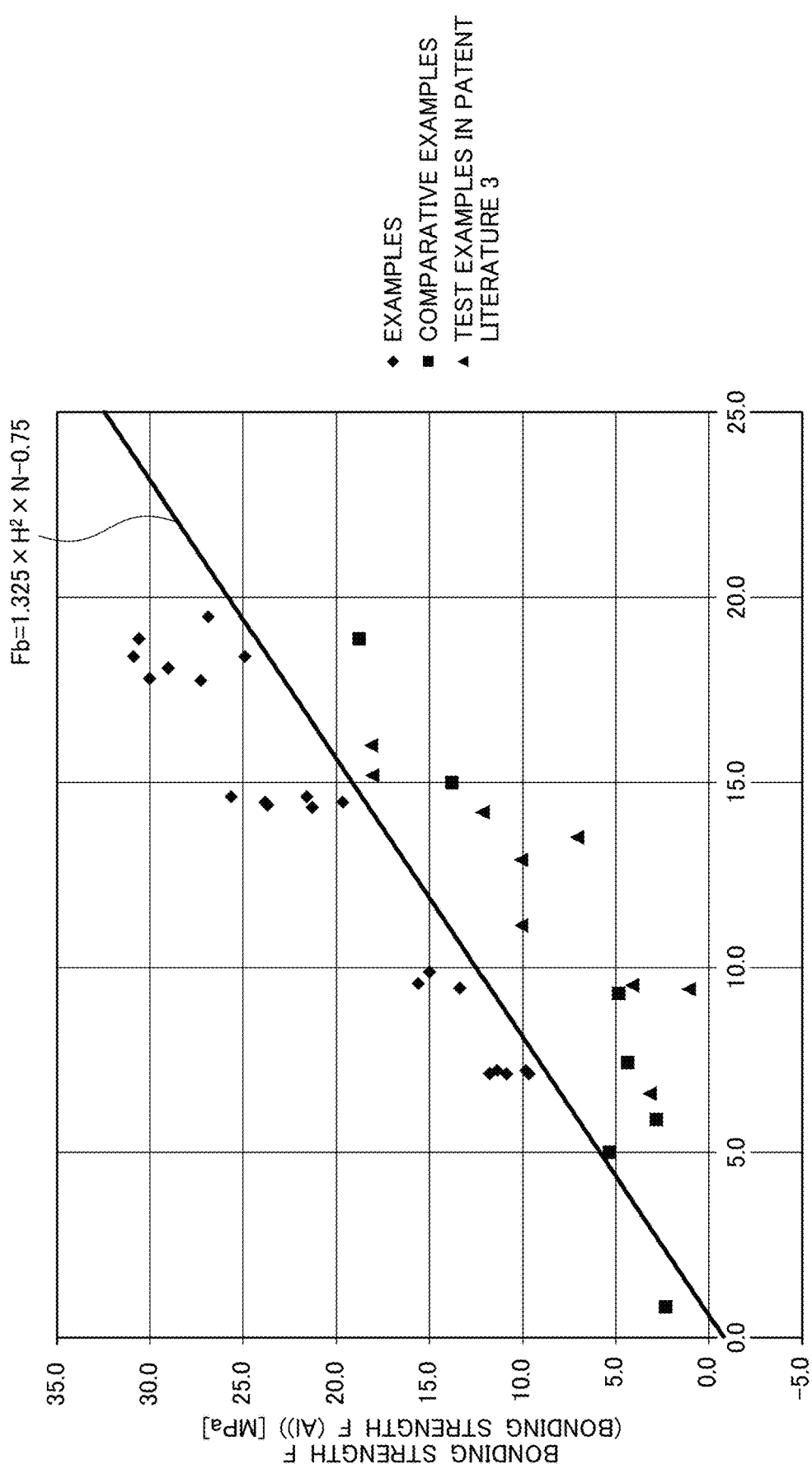
FIG. 16 is a graph obtained by plotting a bonding strength F (bonding strength F (Al)) (vertical axis) with respect to $H^2 \times N$ (horizontal axis).

In FIG. 16, a graph obtained by plotting the bonding strength F (bonding strength F (Al)) (vertical axis) with respect to $H^2 \times N$ (horizontal axis) is shown. In the graph of FIG. 16, the height H of the projections P is equal to or larger than 0.2 mm and smaller than 0.5 mm. Further, in FIG. 16, test examples (Examples 1, 4 to 6, 8, and 9, and Comparative Examples, 1, 2, and 4) disclosed in Table 1 of Patent Literature 3 are also plotted for reference.

As is apparent from FIG. 16, in all Examples, the bonding strength F (bonding strength F (Al)) exhibited a value exceeding the boundary bonding strength Fb. On the other hand, in Comparative Examples, except for Comparative Example 3 in which the bonding strength F (bonding strength F (Al)) suitable for practical use was not obtained (leftmost black square mark in the graph), the bonding strength F (bonding strength F (Al) was smaller than the boundary bonding strength Fb. Further, also for the test examples disclosed in Table 1 of Patent Literature 3, the bonding strength F (bonding strength F (Al) was significantly smaller than the boundary bonding strength Fb.

From the results described above, it is considered that, in a range in which the bonding strength F (bonding strength F (Al)) suitable for practical use is relatively easily ensured, specifically, in a range in which the height H of the projections P is proper and the projection number N is proper (range in which $H^2 \times N$ is approximately equal to or larger than 6.0), the shape elements of the projections P of the cast-iron cylindrical member of this embodiment are comprehensively more suitable for the improvement of the bonding strength as compared to Comparative Examples and the test examples disclosed in Table 1 of Patent Literature 3.

Figure 17:
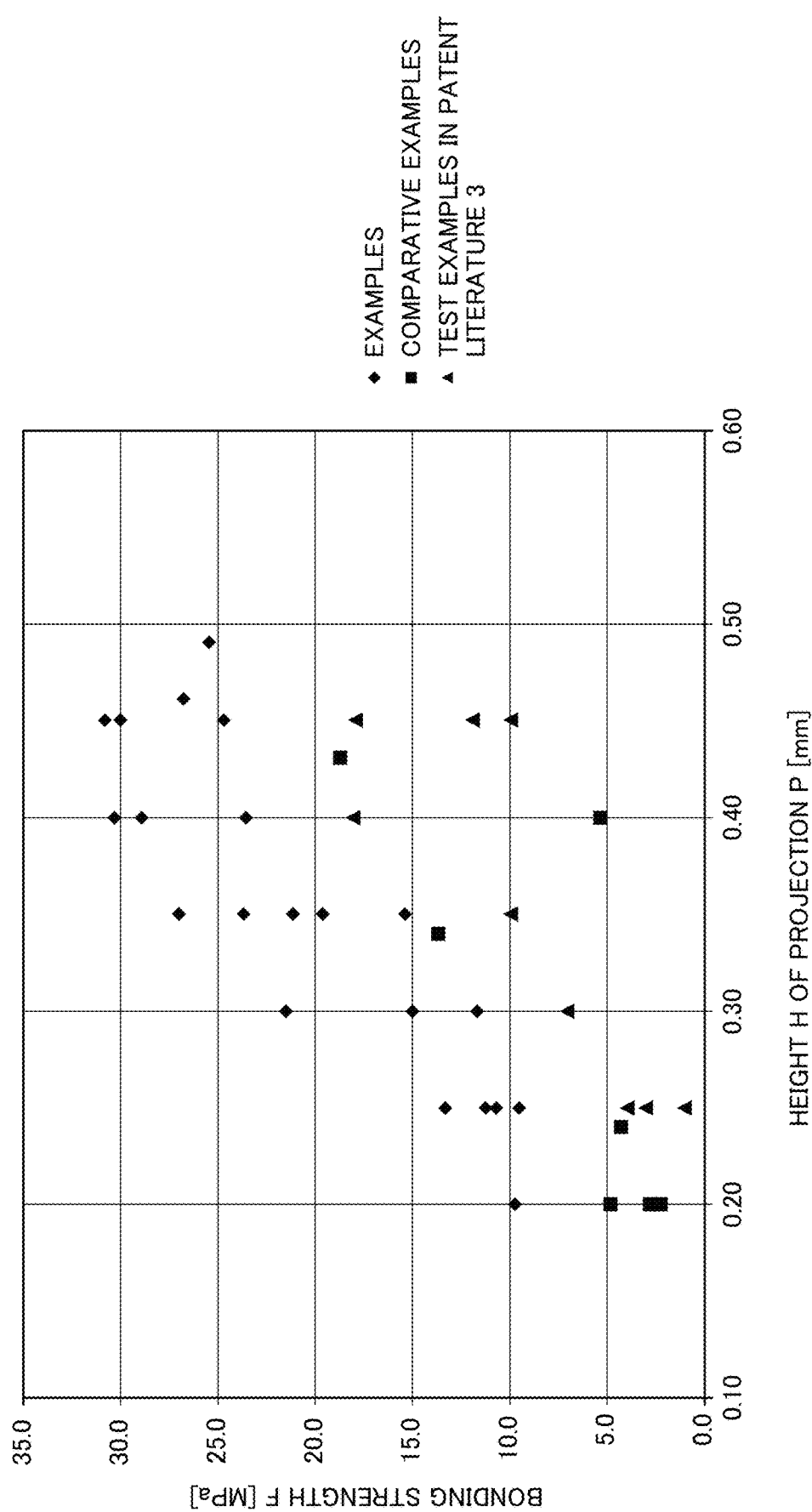
FIG. 17 is a graph obtained by plotting the bonding strength F (vertical axis) with respect to a height H of a projection P (horizontal axis).

In FIG. 17, a graph obtained by plotting the bonding strength F (vertical axis) with respect to the height H (horizontal axis) of the projections P is shown. In the graph of FIG. 17, the height H of the projections P is equal to or larger than 0.2 mm and smaller than 0.5 mm. Further, in FIG. 17, the test examples (Examples 1, 4 to 6, 8, and 9, and Comparative Examples, 1, 2, and 4) disclosed in Table 1 of Patent Literature 3 are also plotted for reference.

As is apparent from FIG. 17, it is found that, with the same bonding strength F, the height H of the projections P can be reduced in Examples as compared to Comparative Examples and the test examples disclosed in Table 1 of Patent Literature 3. Therefore, it can be said that, in the composite structure using the cast-iron cylindrical member of this embodiment, a further reduction in thickness in the vicinity of the bonded portion between the cast-iron cylindrical member and the outer periphery-side member is facilitated while the same degree of bonding strength as that in the related art is ensured.

Figure 18:
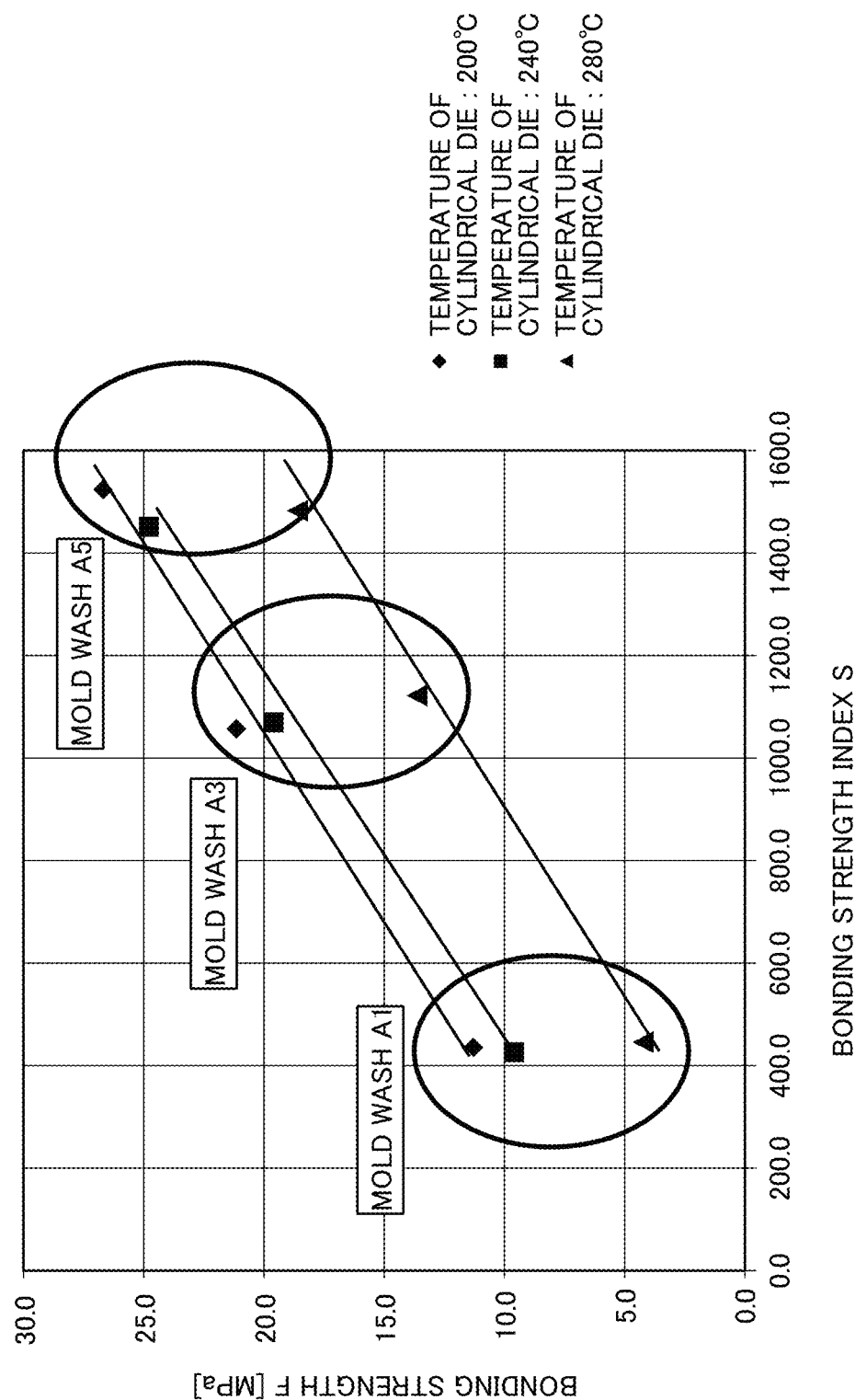
FIG. 18 is a graph obtained by plotting the bonding strength F with respect to a bonding strength index S (horizontal axis) for results of tests conducted on Examples 16 to 21 and Comparative Examples 7 to 9.
Figure 19:
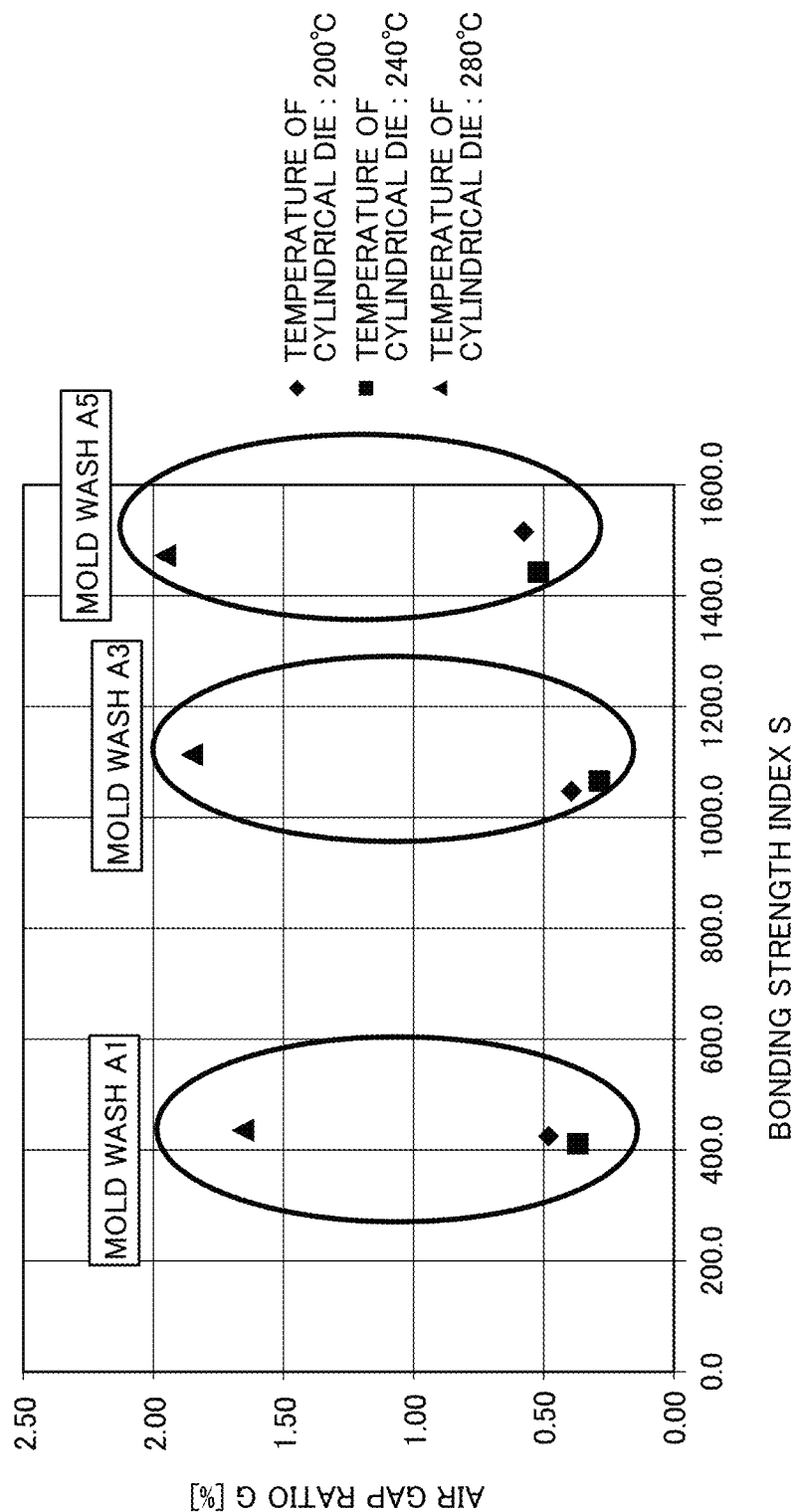
FIG. 19 is a graph obtained by plotting an air gap ratio G with respect to the bonding strength index S (horizontal axis) for the results of tests conducted on Examples 16 to 21 and Comparative Examples 7 to 9.

A graph obtained by plotting the bonding strength F with respect to the bonding strength index S (horizontal axis) for the results of tests on Examples 16 to 21 and Comparative Examples 7 to 9 is shown in FIG. 18, whereas a graph obtained by plotting the air gap ratio G with respect to the bonding strength index S (horizontal axis) for the results of tests on Examples 16 to 21 and Comparative Examples 7 to 9 is shown in FIG. 19. In the graphs, manufacturing conditions (temperature of the cylindrical die and kind of mold wash) are also shown.

As is apparent from FIG. 18, it is found that: (i) under the same condition for the temperature condition of the cylindrical die, the bonding strength F increases approximately linearly along with an increase in bonding strength index S, and (ii) with the same bonding strength index S, although the bonding strength rapidly increases when the temperature of the cylindrical die decreases from 280° C. to 240° C., an increase in bonding strength is relatively further reduced when the temperature of the cylindrical die decreases from 240° C. to 200° C.

The bonding strength index S is a parameter in which only the constriction ratio NP is reflected among the shape elements of the projections P and the shape elements of the projections P other than the constriction ratio NP are not reflected. In consideration of this fact, it is considered that the phenomenon described above in the item (ii) suggests that the shape elements of the projections P other than the constriction ratio NP change so as to significantly increase the bonding strength F along with a decrease in temperature of the cylindrical die from 280° C. to 240° C. Further, also based on the results shown in FIG. 19, it is considered that the changes in shape elements of the projections P other than the constriction ratio NP are closely associated with a change in air gap ratio G.

<Other Reference Data>

Figure 20:
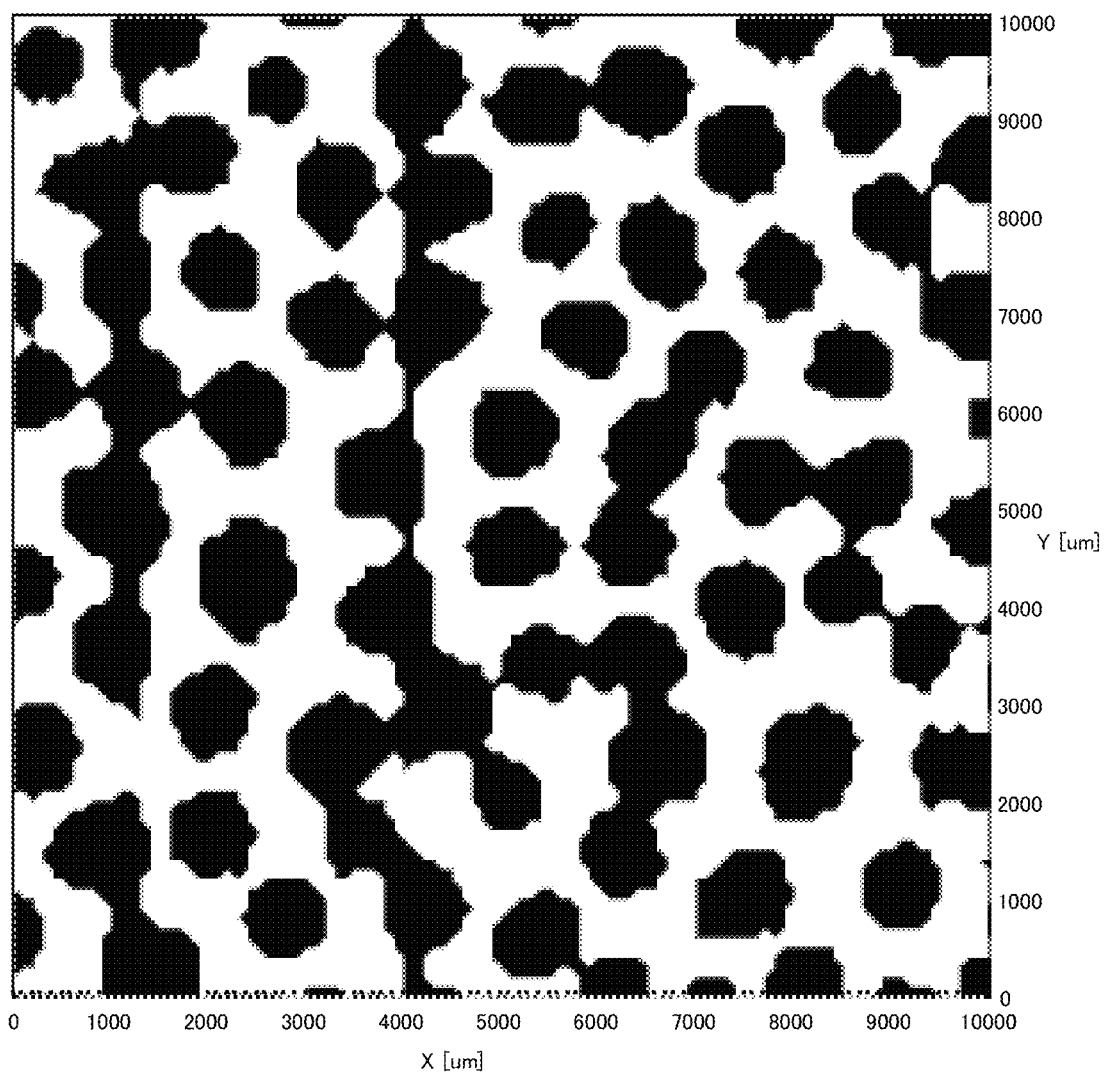
FIG. 20 is an example of a 150-micrometer contour map of the evaluation sample of Comparative Example 6.

Just for reference, a 150-micrometer contour map of the evaluation sample of Comparative Example 6 is shown in FIG. 20.

REFERENCE SIGNS LIST

10: cast-iron cylindrical member
10S: outer peripheral surface
10Sb: outer peripheral basal surface
10St: top surface
20: internal combustion engine
20T: top portion
20M: intermediate portion
20B: basal portion
20C: coupling portion
30: cylinder liner
32: cylinder block
34: cylinder bore
36: cooling fluid passage
40: wheel
42: drum portion
42S: inner peripheral surface
44: brake drum
44S: inner peripheral surface
46: brake shoe
50: cylindrical die
50S: inner peripheral surface
52: mold wash layer
54A: air bubble
54A1: large size air bubbles
54A2: small size air bubbles
54B: recessed hole
54C1: recessed hole
54C2: recessed hole
100: XY table
102: measurement stand
110: evaluation sample
110S: outer peripheral surface
120: non-contact three-dimensional laser measuring apparatus
122: laser radiating portion
200: table
210: V-block stand
220: microscope
230: auxiliary light source
300A: cursor line
300B: cursor line
400: double-type cylinder
402: first test piece
410: cast-iron cylindrical member (cylinder liner)
420: cylinder block
430: cylinder bore

The invention claimed is:

1. A cast-iron cylindrical member having an outer peripheral surface,
the outer peripheral surface of the cast-iron cylindrical member being made up of a casted surface and having a plurality of projections (P) formed integrally with the casted surface, wherein:

(A) the plurality of projections (P) have an average height equal to or larger than 0.20 mm and smaller than 0.50 mm;
(B) a total number of the plurality of projections (P) per cm² of the outer peripheral surface is equal to or larger than 61 and equal to or smaller than 180;
(C) the plurality of projections (P) comprise a projection (Pn) having a constricted shape;
(D) a ratio of a number of the projections (Pn) having the constricted shape to a number of the plurality of projections (P) present on the outer peripheral surface is equal to or larger than 50%;
(E) a value S expressed by:

$$S=H^2 \times N \times NP \qquad \text{Expression (1)}$$

is equal to or larger than 310; and
(F1) a bonding strength F (Al) obtained when the outer peripheral surface of the cast-iron cylindrical member is cast-in inserted with an aluminum alloy exceeds a value Fb expressed by:

$$Fb=1.325 \times H^2 \times N - 0.75, \qquad \text{Expression (2)}$$

in Expression (1) and Expression (2), S is a bonding strength index, H is the average height (mm) of the plurality of projections (P), N is a total number (number/cm²) of the plurality of projections (P) per cm² of the outer peripheral surface, NP is a ratio (%) of the number of projections (Pn) having the constricted shape to the number of the plurality of projections (P) present on the outer peripheral surface, and Fb is a boundary bonding strength (MPa).

2. A cast-iron cylindrical member having an outer peripheral surface,
the outer peripheral surface of the cast-iron cylindrical member being made up of a casted surface and having a plurality of projections (P) formed integrally with the casted surface, wherein:
(A) the plurality of projections (P) have an average height equal to or larger than 0.20 mm and smaller than 0.50 mm;
(B) a total number of the plurality of projections (P) per cm² of the outer peripheral surface is equal to or larger than 61 and equal to or smaller than 180;
(C) the plurality of projections (P) comprise a projection (Pn) having a constricted shape;
(D) a ratio of a number of the projections (Pn) having the constricted shape to a number of the plurality of projections (P) present on the outer peripheral surface is equal to or larger than 50%;
(E) a value S expressed by:

$$S=H^2 \times N \times NP \qquad \text{Expression (1)}$$

is equal to or larger than 310; and
(F2) a ratio of the number of projections (Pn) having the constricted shape, each having 0.65 or smaller as a ratio of a height of a position of a most constricted portion to a height of the projection (Pn) having the constricted shape, to the number of projections (Pn) having the constricted shape present on the outer peripheral surface is equal to or larger than 40%,
in Expression (1), S is a bonding strength index, H is the average height (mm) of the plurality of projections (P), N is a total number (number/cm²) of the plurality of projections (P) per cm² of the outer peripheral surface, NP is a ratio (%) of the number of projections (Pn) having the constricted shape to the number of the plurality of projections (P) present on the outer peripheral surface.

3. A cast-iron cylindrical member according to claim 1, wherein the conditions (A) to (E), (F1), and a condition (F2) are satisfied; and
wherein (F2) a ratio of the number of projections (Pn) having the constricted shape, each having 0.65 or smaller as a ratio of a height of a position of a most constricted portion to a height of the projection (Pn) having the constricted shape, to the number of projections (Pn) having the constricted shape present on the other peripheral surface is equal to or larger than 40%.

4. A cast-iron cylindrical member according to claim 1, wherein, when an area ratio of a region surrounded by a contour line at a measurement height of 0.15 mm on a contour map is S1, the area ratio S1 falls within a range of from 15% to 50%, the contour map being obtained by measuring 1 cm² of the outer peripheral surface by radiation of a laser beam onto the outer peripheral surface by using a non-contact three-dimensional laser measuring apparatus.

5. A cast-iron cylindrical member according to claim 1, wherein the bonding strength index S is equal to or larger than 500.

6. A cast-iron cylindrical member according to claim 1, wherein at least part of the outer peripheral surface of the cast-iron cylindrical member is covered with another member so that the cast-iron cylindrical member and the another member are integrated with each other.

7. A cast-iron cylindrical member according to claim 1, comprising a cylinder liner for an internal combustion engine in which a piston and a piston ring slide on an inner peripheral surface of the cast-iron cylindrical member in a reciprocating manner.

8. A cast-iron cylindrical member according to claim 1, comprising a brake drum for an internal expanding drum brake in which brake shoes slide on an inner peripheral surface of the cast-iron cylindrical member.

9. A composite structure comprising:
a cast-iron cylindrical member having an outer peripheral surface, the outer peripheral surface of the cast-iron cylindrical member being made up of a casted surface and having a plurality of projections (P) formed integrally with the casted surface, the cast-iron cylindrical member satisfying:
(A) the plurality of projections (P) have an average height equal to or larger than 0.20 mm and smaller than 0.50 mm;
(B) a total number of the plurality of projections (P) per cm² of the outer peripheral surface is equal to or larger than 61 and equal to or smaller than 180;
(C) the plurality of projections (P) comprise a projection (Pn) having a constricted shape;
(D) a ratio of a number of the projections (Pn) having the constricted shape to a number of the plurality of projections (P) present on the outer peripheral surface is equal to or larger than 50%;
(E) a value S expressed by:

$$S=H^2 \times N \times NP \qquad \text{Expression (1)}$$

is equal to or larger than 310; and
(F1) a bonding strength F (Al) obtained when the outer peripheral surface of the cast-iron cylindrical member is cast-in inserted with an aluminum alloy exceeds a value Fb expressed by:

$$Fb=1.325 \times H^2 \times N - 0.75, \qquad \text{Expression (2)}$$

in Expression (1) and Expression (2), S is a bonding strength index, H is the average height (mm) of the plurality of projections (P), N is a total number (number/cm²) of the plurality of projections (P) per cm² of the outer peripheral surface, NP is a ratio (%) of the number of projections (Pn) having the constricted shape to the number of the plurality of projections (P) present on the outer peripheral surface, and Fb is a boundary bonding strength (MPa); and an outer periphery-side member, which covers at least a part of the outer peripheral surface of the cast-iron cylindrical member, wherein the cast-iron cylindrical member and the outer periphery-side member are integrated with each other.

10. A composite structure comprising:

a cast-iron cylindrical member having an outer peripheral surface, the outer peripheral surface of the cast-iron cylindrical member being made up of a casted surface and having a plurality of projections (P) formed integrally with the casted surface, the cast-iron cylindrical member satisfying:

(A) the plurality of projections (P) have an average height equal to or larger than 0.20 mm and smaller than 0.50 mm;

(B) a total number of the plurality of projections (P) per cm² of the outer peripheral surface is equal to or larger than 61 and equal to or smaller than 180;

(C) the plurality of projections (P) comprise a projection (Pn) having a constricted shape;

(D) a ratio of a number of the projections (Pn) having the constricted shape to a number of the plurality of projections (P) present on the outer peripheral surface is equal to or larger than 50%;

(E) a value S expressed by:

$$S = H^2 \times N \times NP \quad \text{Expression (1)}$$

is equal to or larger than 310; and (F2) a ratio of the number of projections (Pn) having the constricted shape, each having 0.65 or smaller as a ratio of a height of a position of a most constricted portion to a height of the projection (Pn) having the constricted shape, to the number of projections (Pn) having the constricted shape present on the outer peripheral surface is equal to or larger than 40%, in Expression (1), S is a bonding strength index, H is the average height (mm) of the plurality of projections (P), N is a total number (number/cm²) of the plurality of projections (P) per cm² of the outer peripheral surface, NP is a ratio (%) of the number of projections (Pn) having the constricted shape to the number of the plurality of projections (P) present on the outer peripheral surface; and an outer periphery-side member, which covers at least a part of the outer peripheral surface of the cast-iron cylindrical member, wherein the cast-iron cylindrical member and the outer periphery-side member are integrated with each other.

11. A composite structure according to claim 9, wherein the conditions (A) to (E), (F1), and a condition (F2) are satisfied; and Wherein (F2) a ratio of the number of projections (Pn) having the constricted shape, each having 0.65 or smaller as a ratio of a height of a position of a most constricted portion to a height of the projection (Pn) having the constricted shape, to the number of projections (Ph) having the constricted shape present on the outer peripheral surface is equal to or larger than 40%.

12. A composite structure according to claim 9, wherein:

the outer periphery-side member comprises a metal outer periphery-side member; and at least a part of the outer peripheral surface of the cast-iron cylindrical member is cast-in inserted with the metal outer periphery-side member.

13. A cast-iron cylindrical member according to claim 2, wherein, when an area ratio of a region surrounded by a contour line at a measurement height of 0.15 mm on a contour map is S1, the area ratio S1 falls within a range of from 15% to 50%, the contour map being obtained by measuring 1 cm² of the outer peripheral surface by radiation of a laser beam onto the outer peripheral surface by using a non-contact three-dimensional laser measuring apparatus.

14. A cast-iron cylindrical member according to claim 2, wherein the bonding strength index S is equal to or larger than 500.

15. A cast-iron cylindrical member according to claim 2, wherein at least part of the outer peripheral surface of the cast-iron cylindrical member is covered with another member so that the cast-iron cylindrical member and the another member are integrated with each other.

16. A cast-iron cylindrical member according to claim 2, comprising a cylinder liner for an internal combustion engine in which a piston and a piston ring slide on an inner peripheral surface of the cast-iron cylindrical member in a reciprocating manner.

17. A cast-iron cylindrical member according to claim 2, comprising a brake drum for an internal expanding drum brake in which brake shoes slide on an inner peripheral surface of the cast-iron cylindrical member.

18. A composite structure according to claim 10, wherein:

the outer periphery-side member comprises a metal outer periphery-side member; and at least a part of the outer peripheral surface of the cast-iron cylindrical member is cast-in inserted with the metal outer periphery-side member.

* * * * *